United States Patent
Tamura et al.

(10) Patent No.: US 9,312,555 B2
(45) Date of Patent: Apr. 12, 2016

(54) HYDROGEN GENERATOR AND FUEL CELL SYSTEM

(71) Applicant: PANASONIC CORPORATION, Osaka (JP)

(72) Inventors: Yoshio Tamura, Hyogo (JP); Koichi Kusumura, Osaka (JP); Yoichi Midorikawa, Chiba (JP); Yoshihiro Mori, Shiga (JP); Kouhei Tsuyuguchi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 47 days.

(21) Appl. No.: 14/378,602

(22) PCT Filed: Oct. 9, 2013

(86) PCT No.: PCT/JP2013/006014
§ 371 (c)(1),
(2) Date: Aug. 13, 2014

(87) PCT Pub. No.: WO2014/103109
PCT Pub. Date: Jul. 3, 2014

(65) Prior Publication Data
US 2014/0377672 A1 Dec. 25, 2014

(30) Foreign Application Priority Data

Dec. 27, 2012 (JP) .................................. 2012-285666

(51) Int. Cl.
*H01M 8/06* (2006.01)
*C01B 3/32* (2006.01)
(Continued)

(52) U.S. Cl.
CPC ............ *H01M 8/0618* (2013.01); *B01J 19/245* (2013.01); *C01B 3/32* (2013.01);
(Continued)

(58) Field of Classification Search
CPC .... C01B 3/32; C01B 3/38; C01B 2203/0227; C01B 2203/045; C01B 2203/067; C01B 2203/0805; C01B 2203/1211; C01B 2203/1258; C01B 2203/127; C01B 2203/148; H01M 8/0618; H01M 8/0625; H01M 8/0675; H01M 8/1246; H01M 2008/1293; H01M 2250/10; H01M 2300/0074; Y02E 60/50; Y02E 60/521; Y02E 60/525; B01J 19/245; B01J 2219/00087; B01J 2219/24
See application file for complete search history.

(56) References Cited

U.S. PATENT DOCUMENTS

| 3,655,448 A | 4/1972 | Setzer |
| 2003/0148167 A1 | 8/2003 | Sugawara et al. |

(Continued)

FOREIGN PATENT DOCUMENTS

| EP | 1002779 A1 | 5/2000 |
| JP | 05-114414 A | 5/1993 |

(Continued)

OTHER PUBLICATIONS

European Extended Search Report issued in European Application No. 13867894.1, dated Mar. 25, 2015.

(Continued)

*Primary Examiner* — Brittany Raymond
(74) *Attorney, Agent, or Firm* — McDermott Will & Emery LLP

(57) ABSTRACT

A hydrogen generator includes: a reformer configured to generate a hydrogen-containing gas by using a raw material; a hydro-desulfurizer configured to remove a sulfur compound in the raw material; a recycle passage through which the hydrogen-containing gas is supplied to the raw material before the raw material flows into the hydro-desulfurizer; a booster configured to supply the raw material to the reformer; a raw material supply passage through which the raw material to be supplied to the reformer flows; and an ejector which is disposed on the raw material supply passage provided downstream of the booster and upstream of the hydro-desulfurizer and into which the hydrogen-containing gas flows from the recycle passage.

12 Claims, 14 Drawing Sheets

(51) Int. Cl.
*C01B 3/38* (2006.01)
*B01J 19/24* (2006.01)
*H01M 8/12* (2006.01)

(52) U.S. Cl.
CPC .............. *C01B 3/38* (2013.01); *H01M 8/0625* (2013.01); *H01M 8/0675* (2013.01); *H01M 8/1246* (2013.01); *B01J 2219/00087* (2013.01); *B01J 2219/24* (2013.01); *C01B 2203/0227* (2013.01); *C01B 2203/045* (2013.01); *C01B 2203/067* (2013.01); *C01B 2203/0805* (2013.01); *C01B 2203/127* (2013.01); *C01B 2203/1211* (2013.01); *C01B 2203/1258* (2013.01); *C01B 2203/148* (2013.01); *H01M 2008/1293* (2013.01); *H01M 2250/10* (2013.01); *H01M 2300/0074* (2013.01); *Y02E 60/50* (2013.01); *Y02E 60/521* (2013.01); *Y02E 60/525* (2013.01)

(56) References Cited

U.S. PATENT DOCUMENTS

| | | |
|---|---|---|
| 2012/0040256 A1 | 2/2012 | Kani et al. |
| 2012/0178006 A1 | 7/2012 | Kani et al. |
| 2013/0143136 A1 | 6/2013 | Ukai et al. |
| 2014/0072888 A1 | 3/2014 | Harada et al. |
| 2014/0072892 A1 | 3/2014 | Maenishi et al. |

FOREIGN PATENT DOCUMENTS

| | | |
|---|---|---|
| JP | 7-215701 A | 8/1995 |
| JP | 11-214024 A | 8/1999 |
| JP | 2006-054171 A | 2/2006 |
| JP | 2006-104003 A | 4/2006 |
| JP | 2008-287959 A | 11/2008 |
| JP | 2009-249203 A | 10/2009 |
| JP | 2009-256120 A | 11/2009 |
| JP | 4493257 B2 | 6/2010 |
| JP | 2011-216308 A | 10/2011 |
| JP | 2012-158489 A | 8/2012 |
| JP | 2012-171850 A | 9/2012 |
| JP | 2012-250876 A | 12/2012 |
| JP | 2013-222573 A | 10/2013 |
| WO | 02/21623 A1 | 3/2002 |
| WO | 2010/044772 A1 | 4/2010 |

OTHER PUBLICATIONS

International Search Report issued in PCT/JP2013/006014, dated Dec. 17, 2013, with English translation.

Extended European Search Report issued in Application No. 13867440.3 dated Nov. 25, 2015.

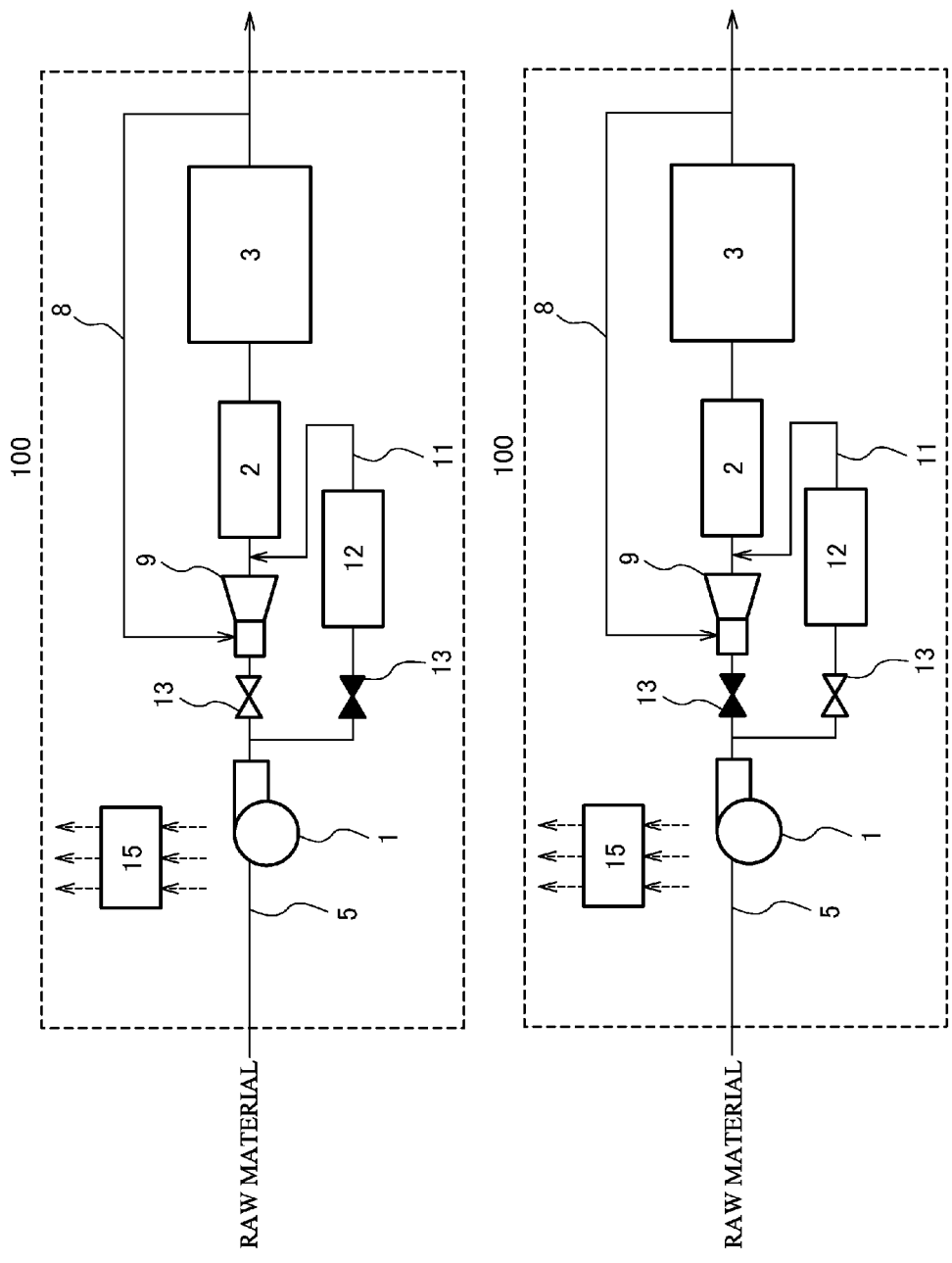

HYDROGEN GENERATOR AND FUEL CELL SYSTEM

RELATED APPLICATIONS

This application is the U.S. National Phase under 35 U.S.C. §371 of International Application No. PCT/JP2013/006014, filed on Oct. 9, 2013, which in turn claims the benefit of Japanese Application No. 2012-285666, filed on Dec. 27, 2012, the disclosures of which Applications are incorporated by reference herein.

TECHNICAL FIELD

The present invention relates to a hydrogen generator and a fuel cell system.

BACKGROUND ART

A fuel cell system can generate electric energy with high efficiency by a reaction between a hydrogen-rich fuel generated by reforming of a raw material and oxygen in air as an oxidizing agent. It is known that the activity of a catalyst used for the reforming of the raw material significantly deteriorates by sulfur poisoning. Therefore, a sulfur component needs to be removed from the raw material before the raw material is supplied to a reformer.

As a method of removing the sulfur compound in the raw material, there are an ordinary temperature desulfurization in which adsorptive desulfurization is performed by an adsorbent at ordinary temperatures and a hydrodesulfurization in which the sulfur compound is reacted with hydrogen on a hydrodesulfurization catalyst to generate hydrogen sulfide, and the hydrogen sulfide is removed by adsorption.

Since the ordinary temperature desulfurization does not require heating, a system configuration thereof is simple. However, since an adsorption capacity of a desulfurizing agent is not large, the desulfurizing agent needs to be replaced periodically.

In contrast, in the hydrodesulfurization, the adsorption capacity is large. Therefore, the system of the hydrodesulfurization can be configured such that the desulfurizing agent does not have to be replaced even in the case of a long time operation. However, before the raw material containing the sulfur compound is supplied to the hydrodesulfurization catalyst, the raw material needs to be mixed with the hydrogen, and the hydrodesulfurization catalyst needs to be heated to about 300° C.

Typically, a home fuel cell system uses a method of circulating a part of the hydrogen-containing gas generated by the reformer, as a source of the hydrogen that is mixed with the raw material. According to this method, before the hydrogen-containing gas is generated by the reformer, there is no hydrogen. Therefore, to avoid the sulfur poisoning of a reforming catalyst during this period of time, for example, an adsorbent for adsorptive desulfurization is provided.

To circulate a part of the hydrogen-containing gas generated by the reformer, a method of disposing a transfer device, such as a blower, on a recycle passage or a method of adjusting a pressure balance by providing, for example, an orifice at an upstream side of a merging portion, at which a raw material supply passage and a hydrogen-containing gas circulation passage merge with each other, such that the pressure of the hydrogen-containing gas becomes higher than the pressure of the merging portion.

In the home fuel cell system of about 1 kW, the operating temperature of a fuel cell is about 80° C. or lower. Therefore, there is a possibility that steam in the circulating hydrogen-containing gas condenses, and the condensed water is supplied to a booster configured to supply the raw material.

Here, proposed as a method of circulating the hydrogen-containing gas generated by the reformer is a method of: causing a part of the hydrogen-containing gas generated in the reformer to flow through a condenser to remove the steam from the hydrogen-containing gas; and then causing the hydrogen-containing gas to merge with the raw material supply passage provided upstream of the booster (see PTLs 1 and 2, for example).

CITATION LIST

Patent Literature

PTL 1: Japanese Patent No. 4,493,257
PTL 2: Japanese Laid-Open Patent Application Publication No. 2011-216308

SUMMARY OF INVENTION

Technical Problem

However, the above-described conventional examples have the following problem.

If the steam in the hydrogen-containing gas condenses before the hydrogen-containing gas flows into the booster through the recycle passage, the condensed water may be supplied to the booster. If the condensed water is supplied to the booster, there may be, for example, a problem regarding a bad influence on the performance of the booster by the inflow of the condensed water.

The present invention was made under these circumstances, and an object of the present invention is to provide a hydrogen generator and a fuel cell system, each of which is capable of making a possibility that condensed water is supplied to a booster lower than conventional cases.

Solution to Problem

To solve the above problem, a hydrogen generator according to one aspect of the present invention includes: a reformer configured to generate a hydrogen-containing gas by using a raw material; a hydro-desulfurizer configured to remove a sulfur compound in the raw material; a recycle passage through which the hydrogen-containing gas is supplied to the raw material before the raw material flows into the hydro-desulfurizer; a booster configured to supply the raw material to the reformer; a raw material supply passage through which the raw material to be supplied to the reformer flows; and an ejector which is disposed on the raw material supply passage provided downstream of the booster and upstream of the hydro-desulfurizer and into which the hydrogen-containing gas flows from the recycle passage.

Advantageous Effects of Invention

The hydrogen generator and fuel cell system according to one aspect of the present invention can make the possibility that the condensed water is supplied to the booster lower than conventional cases.

BRIEF DESCRIPTION OF DRAWINGS

FIGS. 5A and 5B are diagrams each showing one example of the hydrogen generator of Embodiment 5.

DESCRIPTION OF EMBODIMENTS

Embodiment 1

The present inventors have diligently studied a problem regarding condensed water in a booster configured to supply a raw material to a reformer. As a result, the present inventors have obtained the following findings.

As in PTLs 1 and 2, steam is contained in a recycled gas, so that if the recycled gas is cooled, the condensed water is generated from the recycled gas. For example, if the raw material that is lower in temperature than the recycled gas is mixed with the recycled gas, the recycled gas is cooled, so that the condensed water flows into the booster that is the destination of this mixture gas. This may cause a problem that a gas cannot be supplied at an appropriate flow rate since passage clogging or the like is caused by the condensed water in the booster, a problem that the booster breaks, or the like.

Here, a hydrogen generator of Embodiment 1 includes: a reformer configured to generate a hydrogen-containing gas by using a raw material; a hydro-desulfurizer configured to remove a sulfur compound in the raw material; a recycle passage through which the hydrogen-containing gas is supplied to the raw material before the raw material flows into the hydro-desulfurizer; a booster configured to supply the raw material to the reformer; a raw material supply passage through which the raw material to be supplied to the reformer flows; and an ejector which is disposed on the raw material supply passage provided downstream of the booster and upstream of the hydro-desulfurizer and into which the hydrogen-containing gas flows from the recycle passage.

According to this configuration, the hydrogen-containing gas from the recycle passage flows into the ejector provided downstream of the booster. Therefore, the possibility that the condensed water is supplied to the booster can be made lower than conventional cases.

Device Configuration

Figure 1:
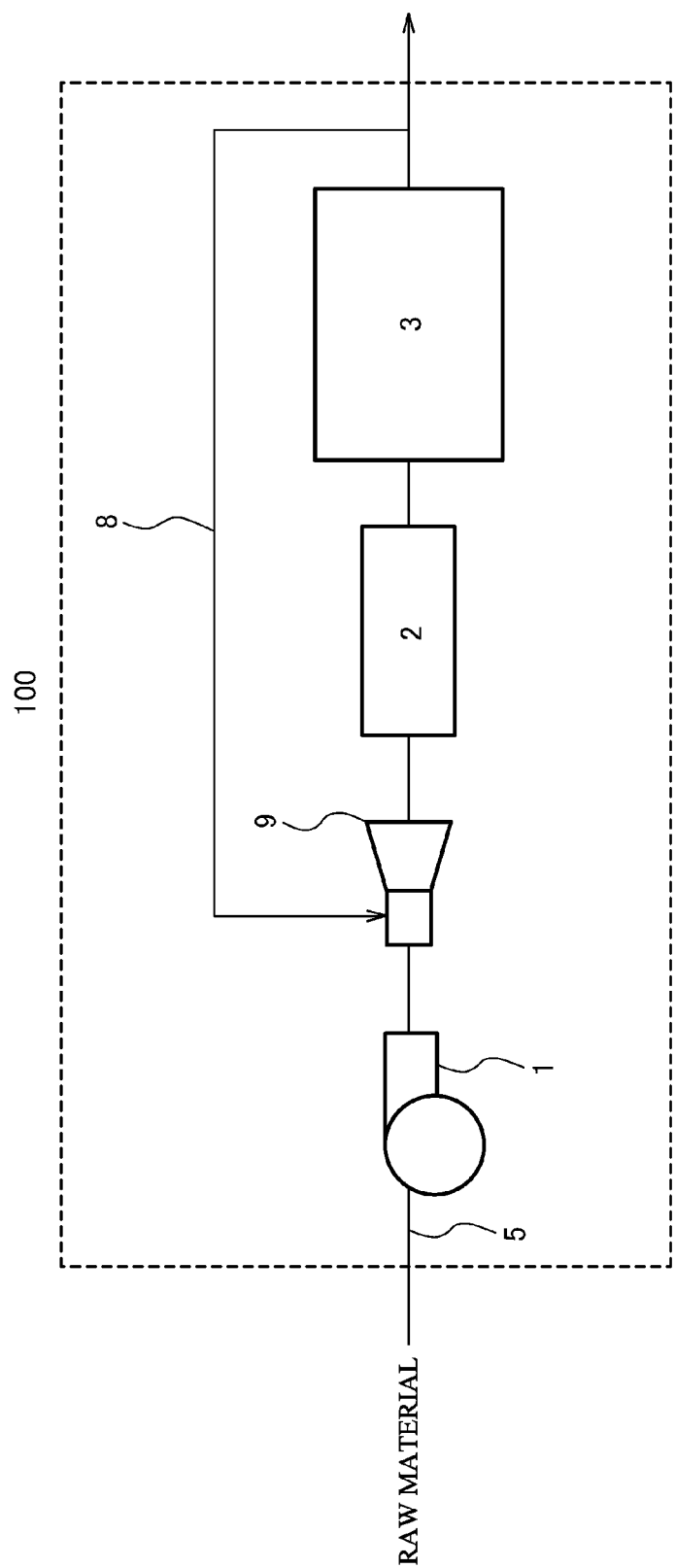
FIG. 1 is a diagram showing one example of a hydrogen generator of Embodiment 1.

FIG. 1 is a diagram showing one example of the hydrogen generator of Embodiment 1.

In the example shown in FIG. 1, a hydrogen generator 100 of the present embodiment includes a reformer 3, a hydro-desulfurizer 2, a raw material supply passage 5, a recycle passage 8, a booster 1, and an ejector 9.

The reformer 3 generates the hydrogen-containing gas by using the raw material. Specifically, the reformer 3 causes a reforming reaction of the raw material to generate the hydrogen-containing gas. The reforming reaction may be any type, and examples thereof include a steam-reforming reaction, an autothermal reaction, and a partial oxidation reaction. Although not shown in FIG. 1, devices required for respective reforming reactions are suitably provided. For example, in a case where the reforming reaction is the steam-reforming reaction, the hydrogen generator 100 includes a combustor configured to heat the reformer 3, an evaporator configured to generate steam, and a water supply unit configured to supply water to the evaporator. In a case where the reforming reaction is the autothermal reaction, the hydrogen generator 100 further includes an air supply unit configured to supply air to the reformer 3. The raw material contains an organic compound constituted by at least carbon and hydrogen, and examples thereof include a city gas containing methane as a major component, a natural gas, and a LPG.

The raw material supply passage 5 is a passage through which the raw material to be supplied to the reformer 3 flows.

The hydro-desulfurizer 2 removes the sulfur compound in the raw material. The hydro-desulfurizer 2 is configured such that a hydrodesulfurization agent is filled in a container. Used as the hydrodesulfurization agent is, for example, a CuZn-based catalyst having both a function to convert the sulfur compound into hydrogen sulfide and a function to adsorb the hydrogen sulfide. However, the hydrodesulfurization agent is not limited to this example. The hydrodesulfurization agent may be constituted by: a CoMo-based catalyst that converts the sulfur compound in the raw material into the hydrogen sulfide; and a ZnO-based catalyst or CuZn-based catalyst as a sulfur adsorbent that is provided downstream of the CoMo-based catalyst and removes the hydrogen sulfide by adsorption.

The recycle passage 8 is a passage through which the hydrogen-containing gas is supplied to the raw material before the raw material flows into the hydro-desulfurizer 2. An upstream end of the recycle passage 8 may be connected to any portion of a passage through which the hydrogen-containing gas from the reformer 3 flows. For example, in a case where a CO reducer configured to reduce carbon monoxide in the hydrogen-containing gas is provided downstream of the reformer 3, the upstream end of the recycle passage 8 may be connected to a passage extending between the reformer 3 and the CO reducer, the CO reducer, or a passage provided downstream of the CO reducer. In a case where the CO reducer includes: a shift converter configured to reduce the carbon monoxide by a shift reaction; and a CO remover configured to reduce the carbon monoxide by at least one of an oxidation reaction and a methanation reaction, the upstream end of the recycle passage 8 may be connected to a passage extending between the shift converter and the CO remover. The upstream end of the recycle passage 8 may be connected to a passage provided downstream of a device (such as a fuel cell) that utilizes the hydrogen-containing gas. The hydrogen generator 100 does not have to include the CO reducer as long as it can provide a required performance with respect to a device that uses the hydrogen-containing gas generated by the hydrogen generator 100.

The booster 1 supplies the raw material to the reformer 3. To supply the raw material to the reformer 3 and the hydro-desulfurizer 2, the pressure of the raw material is increased by the booster 1. To be specific, to cause a predetermined amount of raw material to flow, the pressure of the raw material needs to be increased up to pressure determined in consideration of a passage resistance in a device provided downstream of the booster 1. The booster 1 may have any configuration as long as it can increase the pressure of the raw material. Examples of the booster 1 include a blower and a diaphragm pump. The raw material is supplied from a raw material supply source. The raw material supply source has predetermined supply pressure. Examples of the raw material supply source include a raw material bomb and a raw material infrastructure.

The ejector 9 is disposed on the raw material supply passage 5 provided downstream of the booster 1 and upstream of the hydro-desulfurizer 2, and the hydrogen-containing gas from the recycle passage 8 flows into the ejector 9. Specifically, the ejector 9 is a device configured to pull the hydrogen-containing gas of the recycle passage 8 into the ejector 9 by increasing a flow velocity of the raw material, supplied from the booster 1, to make the pressure of the raw material supply passage 5 in the ejector 9 lower than the pressure of the upstream end of the recycle passage 8. Specifically, the ejector 9 includes a restrictor configured to reduce the cross-sectional area of the raw material supply passage 5, and the restrictor increases the flow velocity of the raw material to generate pressure lower than pressure of a low flow velocity portion where the flow velocity of the raw material is lower than that at a portion where the restrictor is formed. The restrictor may be disposed on at least a part of the raw material supply passage 5 in the ejector 9.

The ejector 9 may be configured such that the recycle passage 8 and the raw material supply passage 5 in the ejector 9 merge with each other at a position where the flow velocity of the raw material is the highest. At the position where the flow velocity of the raw material is the highest, the gas pressure becomes the lowest. Therefore, in a case where the cross-sectional area of the gas passage of the ejector 9 is designed such that the gas pressure becomes lower than the pressure of the upstream side of the recycle passage 8, the hydrogen-containing gas from the recycle passage 8 can be pulled into the ejector 9. By the action of pulling the hydrogen-containing gas into the ejector 9 as above, a device (such as a pressure reducer) configured to adjust the pressure balance does not have to be disposed on the recycle passage 8. With this, the configuration of the hydrogen generator 100 can be simplified, and the cost of the hydrogen generator 100 can be reduced.

As above, the hydrogen generator 100 of the present embodiment drives the ejector 9 by using as a driving source the raw material containing the sulfur compound. Therefore, the booster 1 can circulate and supply the hydrogen, necessary for a hydrogenation reaction, to the hydro-desulfurizer 2 without handling the hydrogen-containing gas containing water. Therefore, the possibility that the condensed water is supplied to the booster 1 can be made lower than conventional cases. In addition, the hydrogen-containing gas can be circulated by a simple configuration.

The hydro-desulfurizer 2 may be included in, that is, integrated with the reformer 3. According to need, for example, an on-off valve configured to open and close the recycle passage 8 may be provided.

The hydrogen generator 100 may be configured such that: the raw material supply passage 5 branches at a position upstream of the ejector 9; and a combustion raw material supply passage through which a combustion raw material is supplied is formed, the combustion raw material being used to increase the temperature of the reforming catalyst until the reformer 3 can generate the hydrogen-containing gas.

With this, after the temperature of the reforming catalyst has reached such a temperature that the reformer 3 can generate the hydrogen-containing gas, the passage through which the raw material flows is switched to the passage of the ejector 9. Thus, the sulfur compound contained in the raw material before the generation of the hydrogen-containing gas is discharged to the outside of the hydrogen generator 100 as a combustion exhaust gas generated by combustion. Therefore, both the prevention of the sulfur poisoning of the reforming catalyst of the reformer 3 and the increase in the life of the hydro-desulfurizer 2 can be realized.

Operations

Hereinafter, the operations of the hydrogen generator 100 will be explained in reference to FIG. 1.

While the hydrogen generator 100 is operating, the raw material flows through the hydro-desulfurizer 2, so that the sulfur compound in the raw material is removed.

A part of the hydrogen-containing gas generated by the reformer 3 is returned through the recycle passage 8 to the raw material supply passage 5, mixed with the raw material, and then supplied to the hydro-desulfurizer 2. By supplying the hydrogen-containing gas to the hydro-desulfurizer 2, the hydro-desulfurizer 2 can remove the sulfur compound in the raw material by the hydrogenation reaction.

At this time, in the present embodiment, the hydrogen-containing gas from the reformer 3 flows through the recycle passage 8, is mixed with the raw material in the ejector 9, and is then supplied to the hydro-desulfurizer 2. To be specific, a mixture gas obtained by mixing the raw material and the recycled gas flows through the raw material supply passage 5 provided downstream of a merging portion where the recycle passage 8 and the raw material supply passage 5 merge with each other. The cross-sectional area of the raw material supply passage 5 in the ejector 9 gradually decreases as described above, and the cross-sectional area of the raw material supply passage 5 provided downstream of the merging portion where the recycle passage 8 and the raw material supply passage 5 merge with each other gradually increases. With this, since the flow velocity of the raw material becomes the highest at the merging portion, the gas pressure becomes the lowest. Then, in a case when the cross-sectional area of the gas passage of the ejector 9 is designed such that the gas pressure of the merging portion becomes lower than the pressure of the upstream side of the recycle passage, the recycled gas can be pulled into the raw material supply passage 5.

Embodiment 2

The hydrogen generator of Embodiment 2 is configured such that the hydrogen generator of Embodiment 1 further includes: a first branch passage that branches from the raw material supply passage extending between the booster and the ejector and merges with the raw material supply passage extending between the ejector and the hydro-desulfurizer; an ordinary temperature desulfurizer disposed on the first branch passage and configured to remove the sulfur compound in the raw material; and a switching unit configured to switch such that the raw material flows to the ejector or the ordinary temperature desulfurizer.

According to this configuration, in a case when the raw material flows through the first branch passage, the flow of the raw material to the ejector can be stopped, and the hydrogen-containing gas generated by the reformer can be prevented from flowing to the recycle passage. Therefore, in a case where the raw material flows through the first branch passage, the circulation of the hydrogen-containing gas can be stopped by a simple configuration. Thus, the effective utilization of the hydrogen-containing gas can be realized.

By causing the raw material to flow through the first branch passage, the raw material can be caused to flow through the ordinary temperature desulfurizer and the hydro-desulfurizer. With this, the sulfur compound in the raw material can be removed by the ordinary temperature desulfurizer. Even in a case where there is no hydrogen, the hydro-desulfurizer can remove a minute amount of sulfur. Therefore, the concentration of the sulfur compound in the raw material to be supplied to the reformer can be further reduced. Thus, the durability of the reformer can be improved.

Except for the above features, the hydrogen generator of the present embodiment may be the same in configuration as the hydrogen generator of Embodiment 1.

Device Configuration

Figure 2:
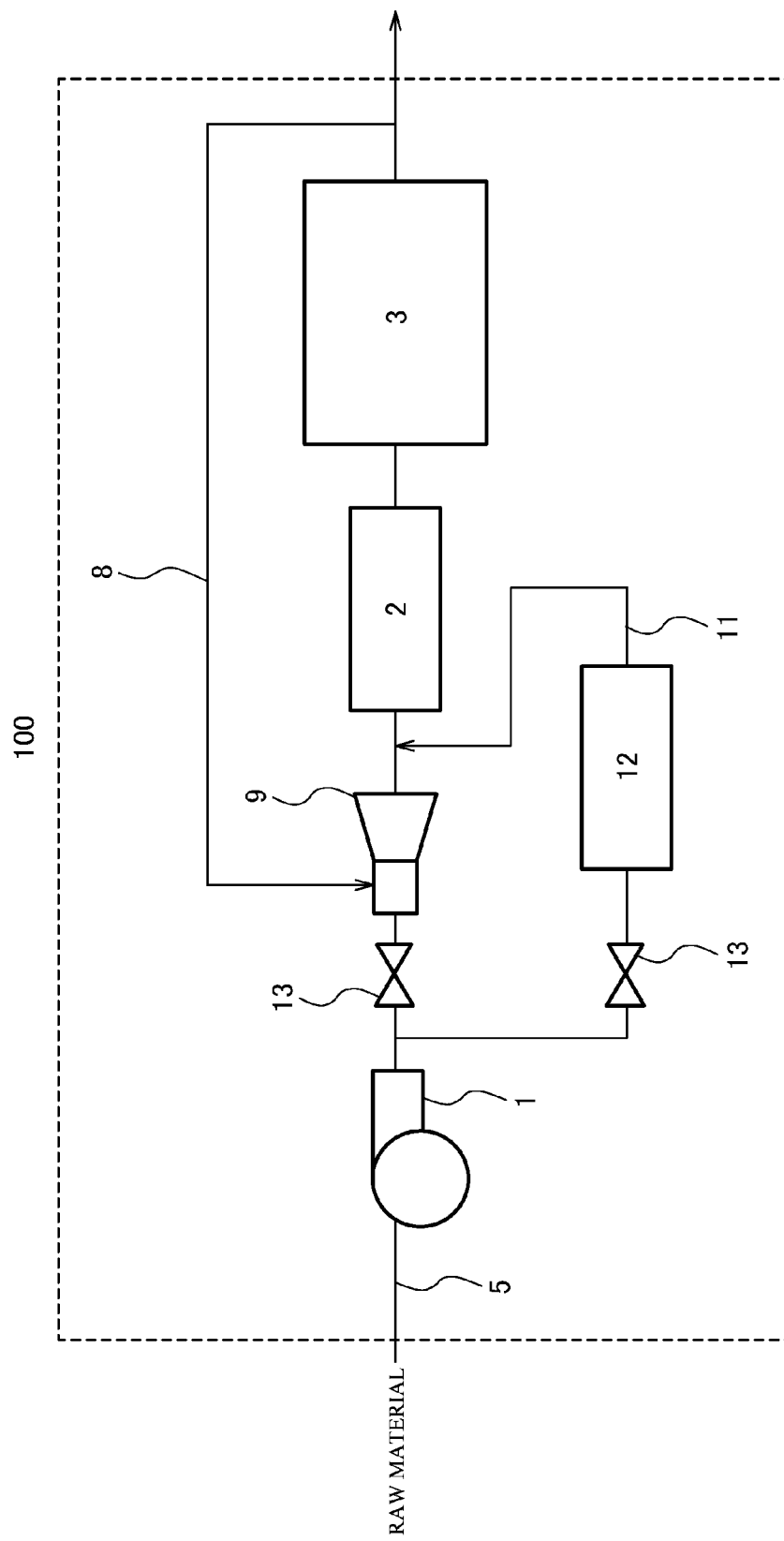
FIG. 2 is a diagram showing one example of the hydrogen generator of Embodiment 2.

FIG. 2 is a diagram showing one example of the hydrogen generator of Embodiment 2.

In the example shown in FIG. 2, the hydrogen generator 100 of the present embodiment includes the reformer 3, the hydro-desulfurizer 2, the raw material supply passage 5, the recycle passage 8, the booster 1, the ejector 9, a first branch passage 11, an ordinary temperature desulfurizer 12, and switching units 13.

Since the reformer 3, the hydro-desulfurizer 2, the raw material supply passage 5, the recycle passage 8, the booster 1, and the ejector 9 are the same as those in Embodiment 1, explanations thereof are omitted.

The first branch passage 11 branches from the raw material supply passage 5 extending between the booster 1 and the ejector 9 and merges with the raw material supply passage 5 extending between the ejector 9 and the hydro-desulfurizer 2.

The ordinary temperature desulfurizer 12 is disposed on the first branch passage 11 and removes the sulfur compound in the raw material. Here, the term "ordinary temperature" used here denotes a temperature relatively closer to an ordinary temperature range than an operating temperature (for example, about 300° C.) of the hydro-desulfurizer 2. Therefore, the term "ordinary temperature" denotes a range from the ordinary temperature range to a temperature at which a desulfurizing agent used here effectively serves as a desulfurizing agent.

The switching units 13 switch such that the raw material flows through the ejector 9 or the ordinary temperature desulfurizer 12. The switching units 13 may have any configuration as long as they can switch such that the raw material flows through the ejector 9 or the ordinary temperature desulfurizer 12. For example, the switching units 13 may be replaced with a combination of a plurality of on-off valves or a three-way valve.

According to this configuration, in a case when the raw material flows through the first branch passage 11, the flow of the raw material to the ejector 9 can be stopped, and the hydrogen-containing gas generated by the reformer 3 can be prevented from flowing through the recycle passage 8. Therefore, in a case where the raw material flows through the first branch passage 11, the circulation of the hydrogen-containing gas can be stopped by a simple configuration. Thus, the effective utilization of the hydrogen-containing gas can be realized.

By causing the raw material to flow through the first branch passage 11, the raw material can be caused to flow through the ordinary temperature desulfurizer 12 and the hydro-desulfurizer 2. With this, the sulfur compound in the raw material can be removed by using the ordinary temperature desulfurizer 12. Even in a case where there is no hydrogen, the hydro-desulfurizer 2 can remove a minute amount of sulfur. Therefore, the concentration of the sulfur compound in the raw material to be supplied to the reformer 3 can be further reduced. Thus, the durability of the reformer 3 can be improved.

The hydrogen generator 100 may be configured such that: a valve, not shown, is disposed on the recycle passage 8; and in a case where the raw material flows through the first branch passage 11, the valve is closed.

Embodiment 3

The hydrogen generator of Embodiment 3 is configured such that the hydrogen generator of Embodiment 1 further includes: a second branch passage that branches from the raw material supply passage extending between the booster and the ejector and merges with the raw material supply passage extending between the hydro-desulfurizer and the reformer; an ordinary temperature desulfurizer disposed on the second branch passage and configured to remove the sulfur compound in the raw material; and a switching unit configured to switch such that the raw material flows through the ejector or the ordinary temperature desulfurizer.

According to this configuration, in a case where the raw material flows through the second branch passage, as with Embodiment 2, the circulation of the hydrogen-containing gas can be stopped by a simple configuration. Thus, the effective utilization of the hydrogen-containing gas can be realized.

By causing the raw material to flow through the second branch passage, the raw material can be caused to flow through the ordinary temperature desulfurizer without being caused to flow through the hydro-desulfurizer. Therefore, the sulfur compound in the raw material can be removed by the ordinary temperature desulfurizer, and the life of the hydro-desulfurizer can be increased.

Except for the above features, the hydrogen generator of the present embodiment may be the same in configuration as the hydrogen generator of Embodiment 1.

Device Configuration

Figure 3:
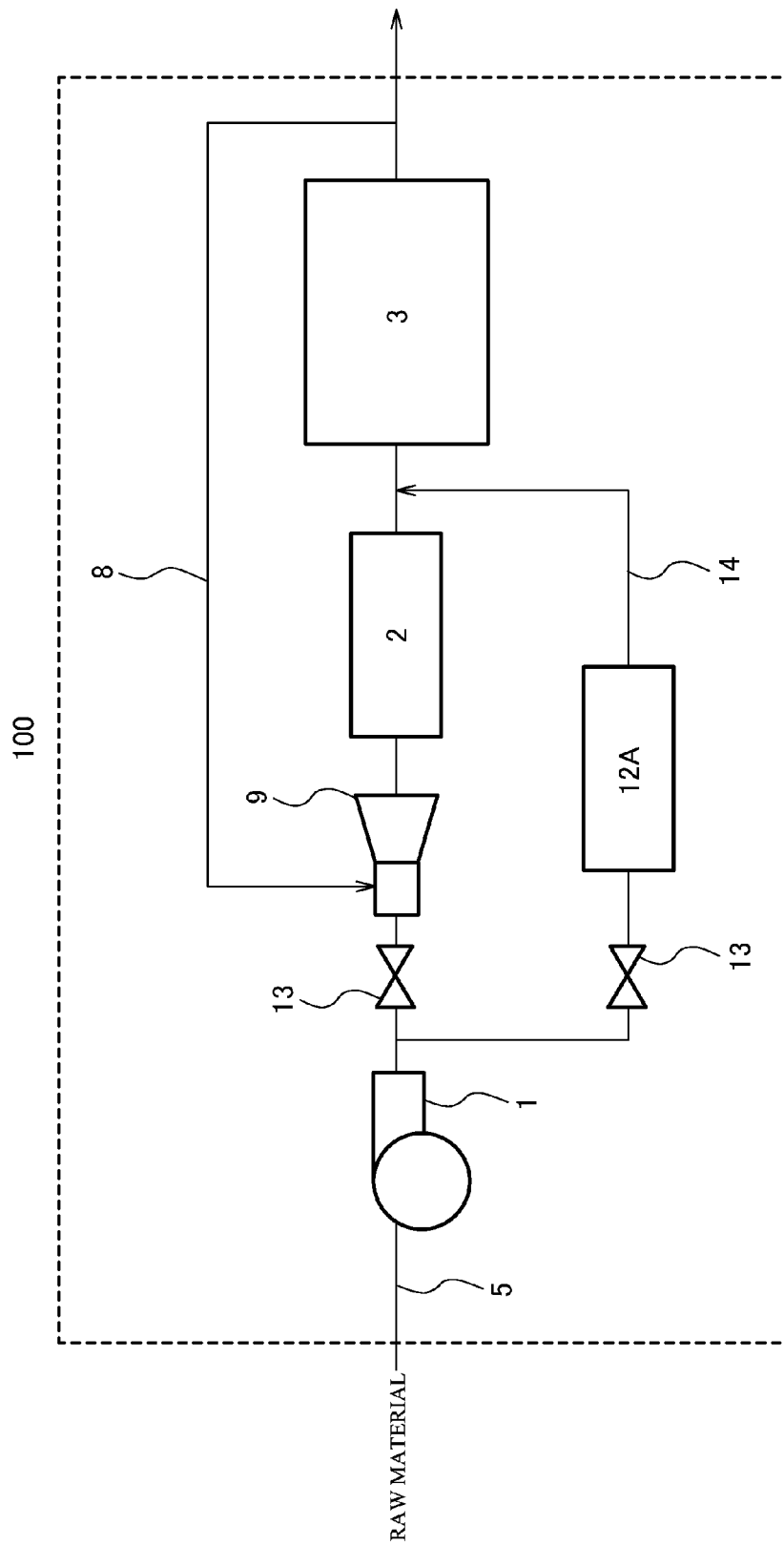
FIG. 3 is a diagram showing one example of the hydrogen generator of Embodiment 3.

FIG. 3 is a diagram showing one example of the hydrogen generator of Embodiment 3.

In the example shown in FIG. 3, the hydrogen generator 100 of the present embodiment includes the reformer 3, the hydro-desulfurizer 2, the raw material supply passage 5, the recycle passage 8, the booster 1, the ejector 9, a second branch passage 14, an ordinary temperature desulfurizer 12A, and the switching units 13.

Since the reformer 3, the hydro-desulfurizer 2, the raw material supply passage 5, the recycle passage 8, the booster 1, the ejector 9, and the switching units 13 are the same as those in Embodiment 2, explanations thereof are omitted.

The second branch passage 14 branches from the raw material supply passage 5 extending between the booster 1 and the ejector 9 and merges with the raw material supply passage 5 extending between the hydro-desulfurizer 2 and the reformer 3.

The ordinary temperature desulfurizer 12A is disposed on the second branch passage 14 and removes the sulfur compound in the raw material. The meaning of the ordinary temperature is the same as above.

According to this configuration, in a case where the raw material flows through the second branch passage 14, as with Embodiment 2, the circulation of the hydrogen-containing gas can be stopped by a simple configuration. Thus, the effective utilization of the hydrogen-containing gas can be realized.

By causing the raw material to flow through the second branch passage 14, the raw material can be caused to flow through the ordinary temperature desulfurizer 12A without being caused to flow through the hydro-desulfurizer 2. Therefore, the sulfur compound in the raw material can be removed by using the ordinary temperature desulfurizer 12A, and the life of the hydro-desulfurizer 2 can be increased.

The hydrogen generator 100 may be configured such that: a valve, not shown, is disposed on the recycle passage 8; and in a case where the raw material flows through the second branch passage 14, the valve is closed.

Embodiment 4

The hydrogen generator of Embodiment 4 is configured such that the hydrogen generator of Embodiment 1 includes: a third branch passage that branches from the raw material supply passage provided upstream of the booster and merges with the raw material supply passage provided upstream of the booster; an ordinary temperature desulfurizer disposed on the third branch passage and configured to remove the sulfur compound in the raw material; and a switching unit configured to switch such that the raw material flows through the ordinary temperature desulfurizer or the raw material supply passage.

According to this configuration, in a case where the raw material flows through the third branch passage, the raw material can be caused to flow through the ordinary temperature desulfurizer and the hydro-desulfurizer. With this, the sulfur compound in the raw material can be removed by using the ordinary temperature desulfurizer. Even in a case when there is no hydrogen, the hydro-desulfurizer can remove a minute amount of sulfur. Therefore, the concentration of the sulfur compound in the raw material to be supplied to the reformer can be further reduced. Thus, the durability of the reformer can be improved.

Except for the above features, the hydrogen generator of the present embodiment may be the same in configuration as the hydrogen generator of Embodiment 1.

Device Configuration

Figure 4:
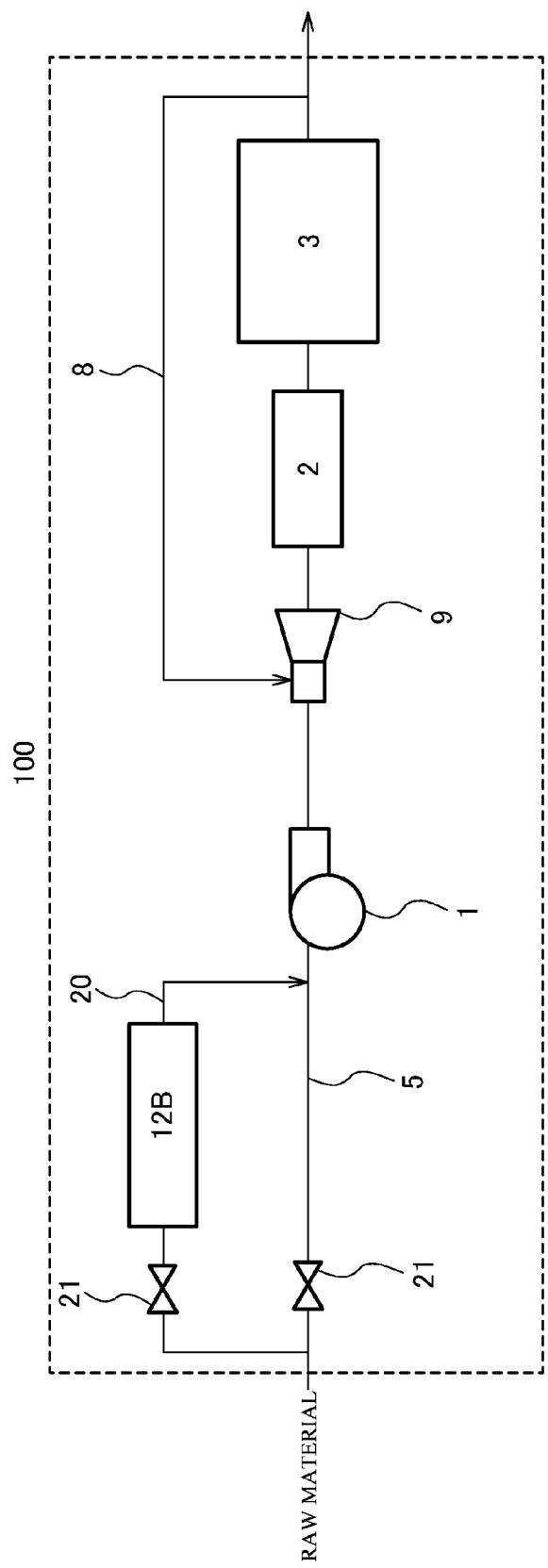
FIG. 4 is a diagram showing one example of the hydrogen generator of Embodiment 4.

FIG. 4 is a diagram showing one example of the hydrogen generator of Embodiment 4.

In the example shown in FIG. 4, the hydrogen generator 100 of the present embodiment includes the reformer 3, the hydro-desulfurizer 2, the raw material supply passage 5, the recycle passage 8, the booster 1, the ejector 9, a third branch passage 20, an ordinary temperature desulfurizer 12B, and switching units 21.

Since the reformer 3, the hydro-desulfurizer 2, the raw material supply passage 5, the recycle passage 8, the booster 1, and the ejector 9 are the same as those in Embodiment 1, explanations thereof are omitted.

The third branch passage 20 branches from the raw material supply passage 5 provided upstream of the booster 1 and merges with the raw material supply passage 5 provided upstream of the booster 1.

The ordinary temperature desulfurizer 12B is disposed on the third branch passage 20 and removes the sulfur compound in the raw material. The meaning of the ordinary temperature is the same as above.

The switching units 21 switch such that the raw material flows through the ordinary temperature desulfurizer 12B or the raw material supply passage 5. The switching units 21 may have any configuration as long as they can switch such that the raw material flows through the ordinary temperature desulfurizer 12B or the raw material supply passage 5. For example, the switching units 21 may be replaced with a combination of a plurality of on-off valves or a three-way valve.

According to this configuration, in a case where the raw material flows through the third branch passage 20, the raw material can be caused to flow through the ordinary temperature desulfurizer 12B and the hydro-desulfurizer 2. With this, the sulfur compound in the raw material can be removed by using the ordinary temperature desulfurizer 12B. Even in a case where there is no hydrogen, the hydro-desulfurizer 2 can remove a minute amount of sulfur. Therefore, the concentration of the sulfur compound in the raw material to be supplied to the reformer 3 can be further reduced. Thus, the durability of the reformer 3 can be improved.

Embodiment 5

The hydrogen generator of Embodiment 5 is configured such that: any one of the hydrogen generators of Embodiments 2 to 4 includes a controller configured to control the switching unit; in a case where a flow rate of the raw material is a predetermined threshold or higher, the controller switches such that the raw material flows through the ejector; and in a case where the flow rate of the raw material is lower than the predetermined threshold, the controller switches such that the raw material flows through the ordinary temperature desulfurizer.

According to this configuration, the controller can appropriately determine whether or not the ejector can pull the hydrogen-containing gas, the amount of which is necessary for the hydrodesulfurization, and the controller can control the switching unit based on this determination.

Except for the above features, the hydrogen generator of the present embodiment may be the same in configuration as any one of the hydrogen generators of Embodiments 2 to 4.

Device Configuration

FIGS. 5A, 5B, 6A, and 6B are diagrams each showing one example of the hydrogen generator of Embodiment 5.

In the example shown in FIGS. 5A and 5B, the hydrogen generator 100 of the present embodiment includes the reformer 3, the hydro-desulfurizer 2, the raw material supply passage 5, the recycle passage 8, the booster 1, the ejector 9, the first branch passage 11, the ordinary temperature desulfurizer 12, the switching units 13, and a controller 15.

Since the reformer 3, the hydro-desulfurizer 2, the raw material supply passage 5, the recycle passage 8, the booster 1, the ejector 9, the first branch passage 11, the ordinary temperature desulfurizer 12, and the switching units 13 are the same as those in Embodiment 2, explanations thereof are omitted.

Figure 6A:
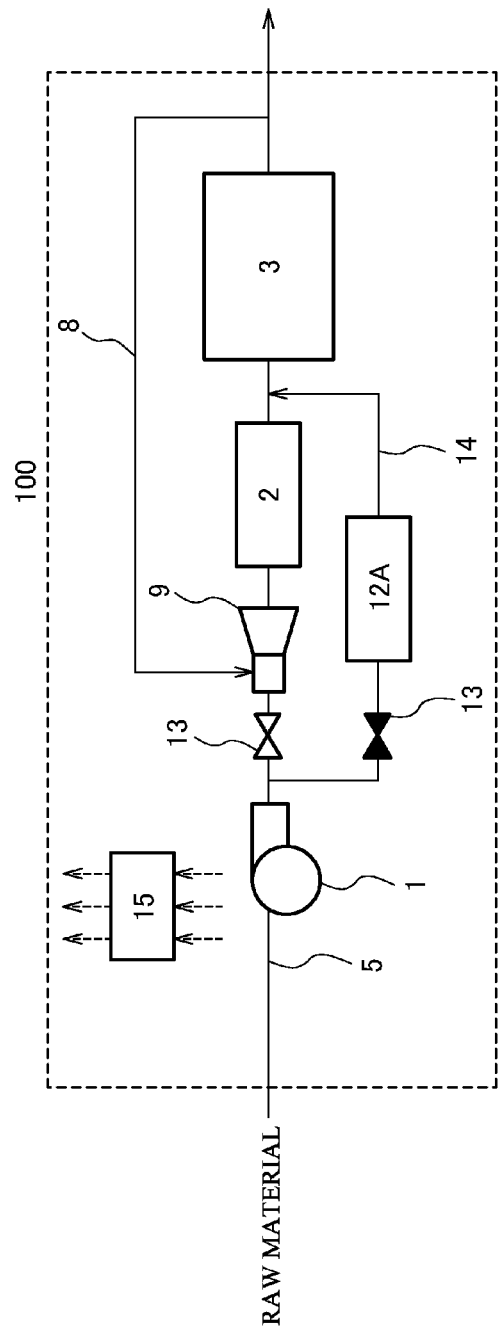
FIGS. 6A and 6B are diagrams each showing one example of the hydrogen generator of Embodiment 5.
Figure 6B:
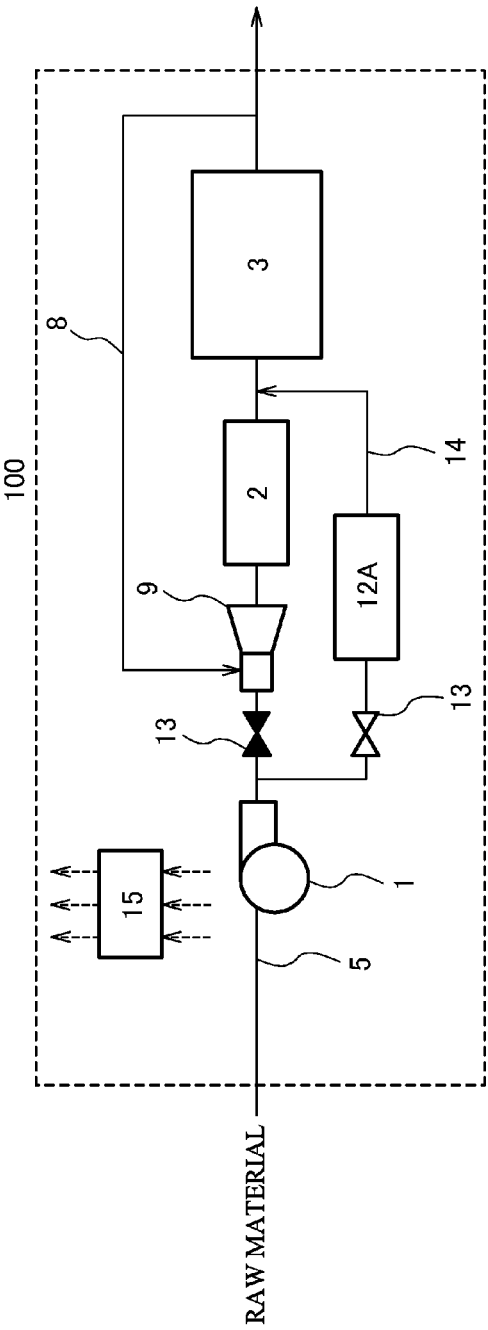

In the example shown in FIGS. 6A and 6B, the hydrogen generator 100 of the present embodiment includes the reformer 3, the hydro-desulfurizer 2, the raw material supply passage 5, the recycle passage 8, the booster 1, the ejector 9, the second branch passage 14, the ordinary temperature desulfurizer 12A, the switching units 13, and the controller 15.

Since the reformer 3, the hydro-desulfurizer 2, the raw material supply passage 5, the recycle passage 8, the booster 1, the ejector 9, the second branch passage 14, the ordinary temperature desulfurizer 12A, and the switching units 13 are the same as those in Embodiment 3, explanations thereof are omitted.

The controller 15 controls the switching units 13. The controller 15 may be any device as long as it has a control function. The controller 15 includes a calculation processing portion (not shown) and a storage portion (not shown) that stores control programs. Examples of the calculation processing portion include a MPU and a CPU. One example of the storage portion is a memory. The controller may be constituted by a single controller that performs centralized control or may be constituted by a plurality of controllers that perform distributed control in cooperation with one another.

Operations

Figure 7:
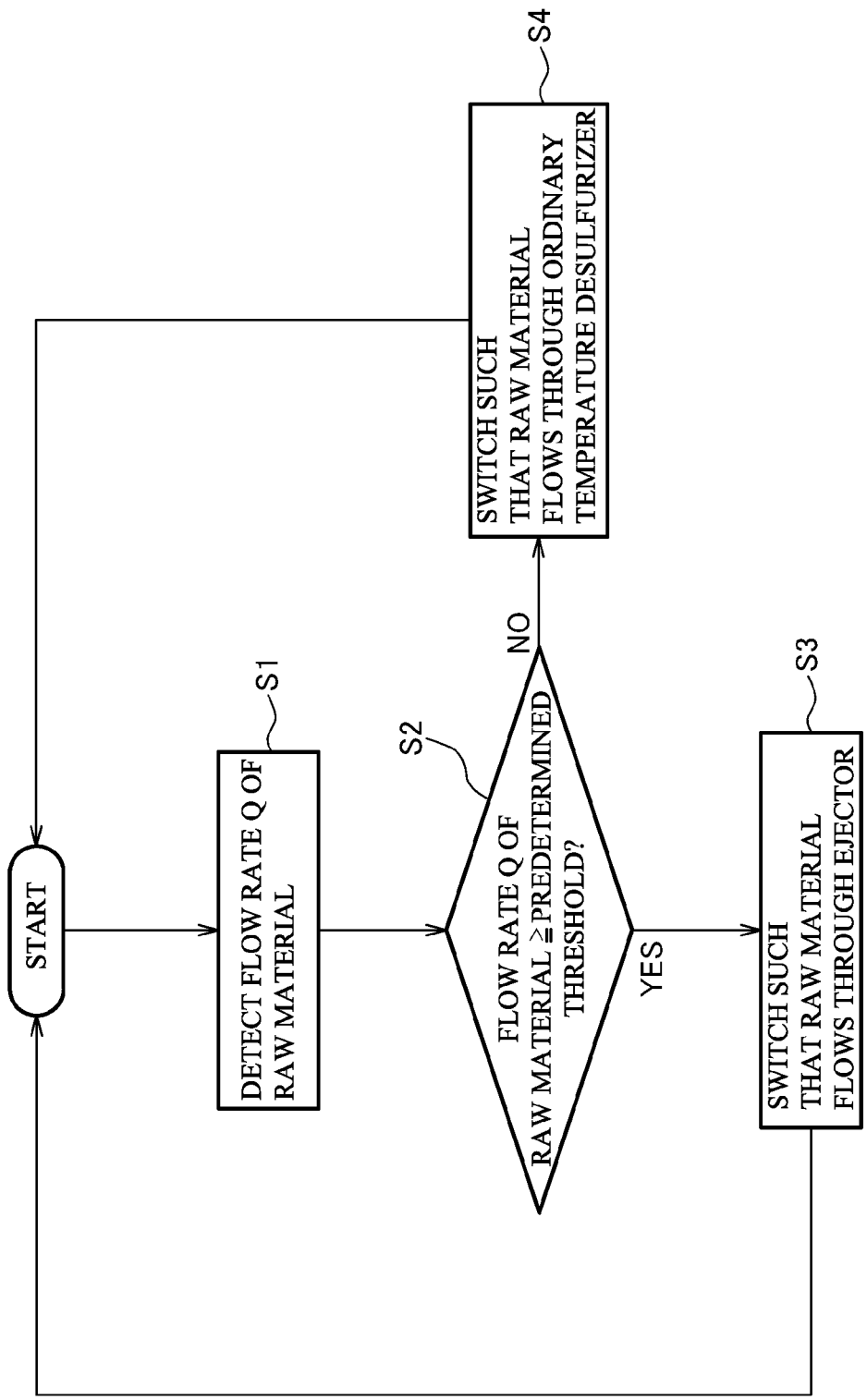
FIG. 7 is a diagram showing one example of operations of the hydrogen generator of Embodiment 5.

FIG. 7 is a diagram showing one example of the operations of the hydrogen generator of Embodiment 5. The following operations are executed by the control programs of the controller 15.

First, in Step S1, a flow rate Q of the raw material from the booster 1 is detected by a flow rate detector, not shown. The flow rate detector may be any detector as long as it can directly or indirectly detect the flow rate Q of the raw material. The detector configured to directly detect the flow rate Q of the raw material is a detector configured to detect the supply amount of the raw material flowing through the raw material supply passage 5, and one example thereof is a flow meter. The detector configured to indirectly detect the flow rate Q of the raw material is a detector configured to detect an amount that correlates with the flow rate Q of the raw material, and examples thereof include a detector configured to detect an output (the number of rotations) of the booster 1 and a controller configured to monitor a control command to the booster 1.

Next, in Step S2, whether or not the flow rate Q of the raw material has exceeded the predetermined threshold is determined. As described above, as the flow velocity of the raw material increases, the pressure of the raw material at the merging portion when the ejector 9 and the recycle passage 8 merge with each other decreases. Therefore, the flow velocity of the raw material flowing through the merging portion can be obtained based on the flow rate Q of the raw material. On this account, whether or not the ejector 9 can pull the hydrogen-containing gas, the amount of which is necessary for the hydrodesulfurization, can be determined based on the flow rate Q of the raw material. The predetermined threshold may be set to a desired value based on passage configurations of the raw material supply passage 5, the recycle passage 8, and the ejector 9, and the like.

In a case when the flow rate Q of the raw material is the predetermined threshold or higher, the controller 15 switches such that the raw material flows through the ejector 9 (Step S3). For example, as shown in FIGS. 5A and 6A, the controller 15 may switch such that: a valve disposed on the raw material supply passage 5 as one of a pair of valves that are examples of the switching units 13 is open; and the other valve is closed. With this, in a case when the hydrogen-containing gas flowing through the recycle passage 8 can be pulled into the ejector 9, the hydrogen-containing gas and the raw material can be mixed in the ejector 9, and the mixture gas can be supplied to the hydro-desulfurizer 2.

In a case where the flow rate Q of the raw material is lower than the predetermined threshold, the controller 15 switches such that the raw material flows through the ordinary temperature desulfurizer 12 or 12A (Step S4). For example, as shown in FIGS. 5B and 6B, the controller 15 may switch such that: a valve disposed on the raw material supply passage 5 as one of a pair of valves that are examples of the switching units 13 is open; and the other valve is closed. With this, in a case where the hydrogen-containing gas flowing through the recycle passage 8 cannot be pulled into the ejector 9, the raw material can be supplied to the ordinary temperature desulfurizer 12 or 12A.

Embodiment 6

The hydrogen generator of Embodiment 6 is configured such that the hydrogen generator of Embodiment 1 includes: a first branch passage that branches from the raw material supply passage extending between the booster and the ejector and merges with the raw material supply passage extending between the ejector and the hydro-desulfurizer; and a switching unit configured to switch such that the raw material flows through the ejector or the first branch passage.

According to this configuration, in a case where the raw material flows through the first branch passage, the flow of the raw material to the ejector can be stopped, and the hydrogen-containing gas generated by the reformer can be prevented from flowing through the recycle passage. Therefore, the effective utilization of the hydrogen-containing gas can be realized by a simple configuration. In addition, since the pressure loss by the ejector can be avoided, the power consumption of the booster can be reduced.

Except for the above features, the hydrogen generator of the present embodiment may be the same in configuration as the hydrogen generator of Embodiment 1.

Device Configuration

Figure 8:
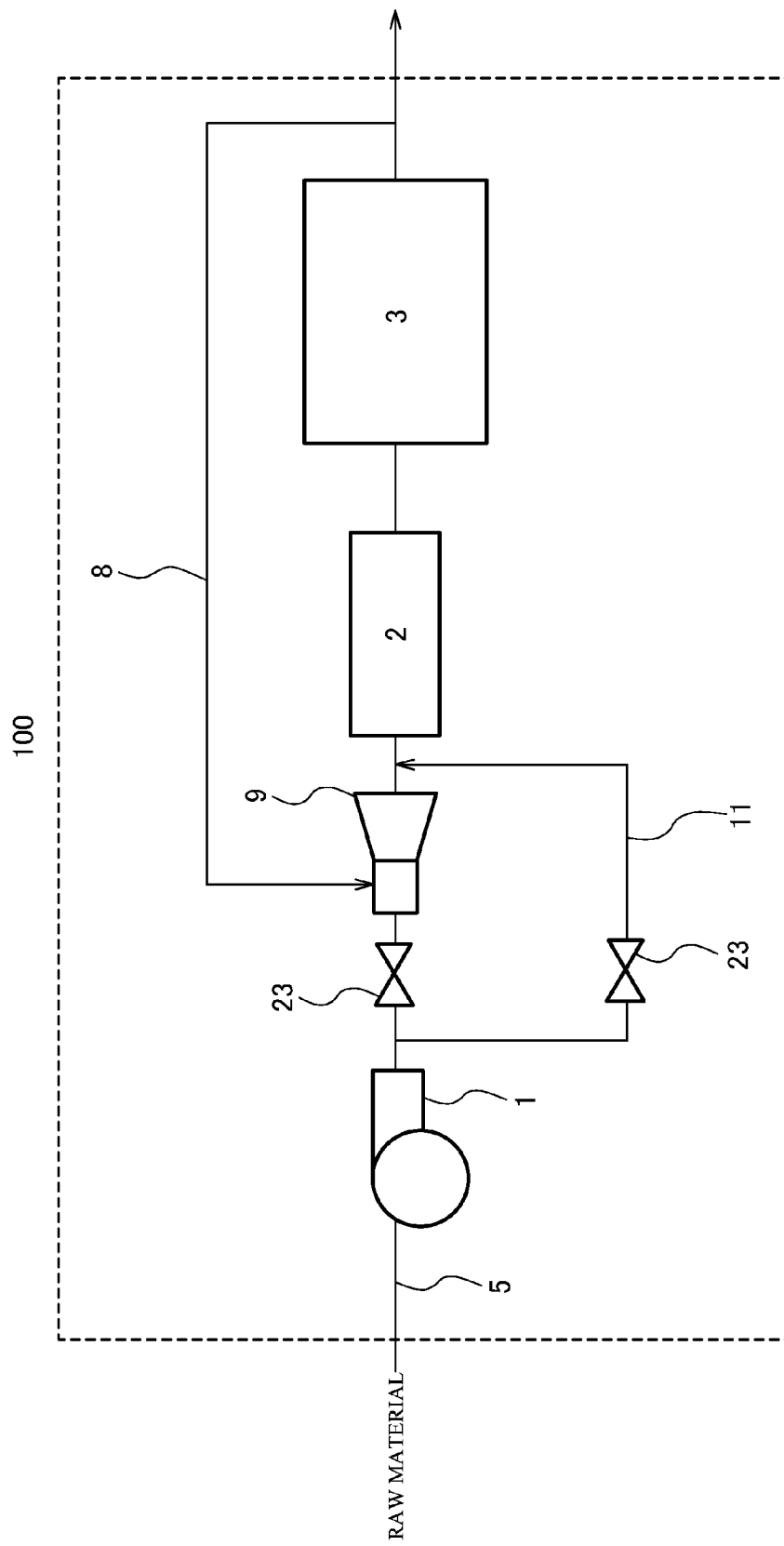
FIG. 8 is a diagram showing one example of the hydrogen generator of Embodiment 6.

FIG. 8 is a diagram showing one example of the hydrogen generator of Embodiment 6.

In the example shown in FIG. 8, the hydrogen generator 100 of the present embodiment includes the reformer 3, the hydro-desulfurizer 2, the raw material supply passage 5, the recycle passage 8, the booster 1, the ejector 9, the first branch passage 11, and switching units 23.

Since the reformer 3, the hydro-desulfurizer 2, the raw material supply passage 5, the recycle passage 8, the booster 1, the ejector 9, and the first branch passage 11 are the same as those in Embodiment 2, explanations thereof are omitted.

The switching units 23 switch such that the raw material flows through the ejector 9 or the first branch passage 11. The switching units 23 may have any configuration as long as they can switch such that the raw material flows through the ejector 9 or the first branch passage 11. For example, the switching units 23 may be replaced with a combination of a plurality of on-off valves or a three-way valve.

According to this configuration, in a case when the raw material flows through the first branch passage 11, the flow of the raw material to the ejector 9 can be stopped, and the hydrogen-containing gas generated by the reformer 3 can be prevented from flowing through the recycle passage 8. Therefore, the effective utilization of the hydrogen-containing gas can be realized by a simple configuration. In addition, since the pressure loss by the ejector 9 can be avoided, the power consumption of the booster 1 can be reduced.

Embodiment 7

The hydrogen generator of Embodiment 7 is configured such that the hydrogen generator of Embodiment 1 includes a heater configured to heat the ejector.

According to this configuration, the ejector is heated by the heater. Therefore, even in a case where the hydrogen-containing gas has flown into the ejector, the possibility that the passage resistance increases by the condensed water in the ejector or the possibility that the passage clogging occurs by the condensed water in the ejector can be made lower than conventional cases.

Device Configuration

Figure 9:
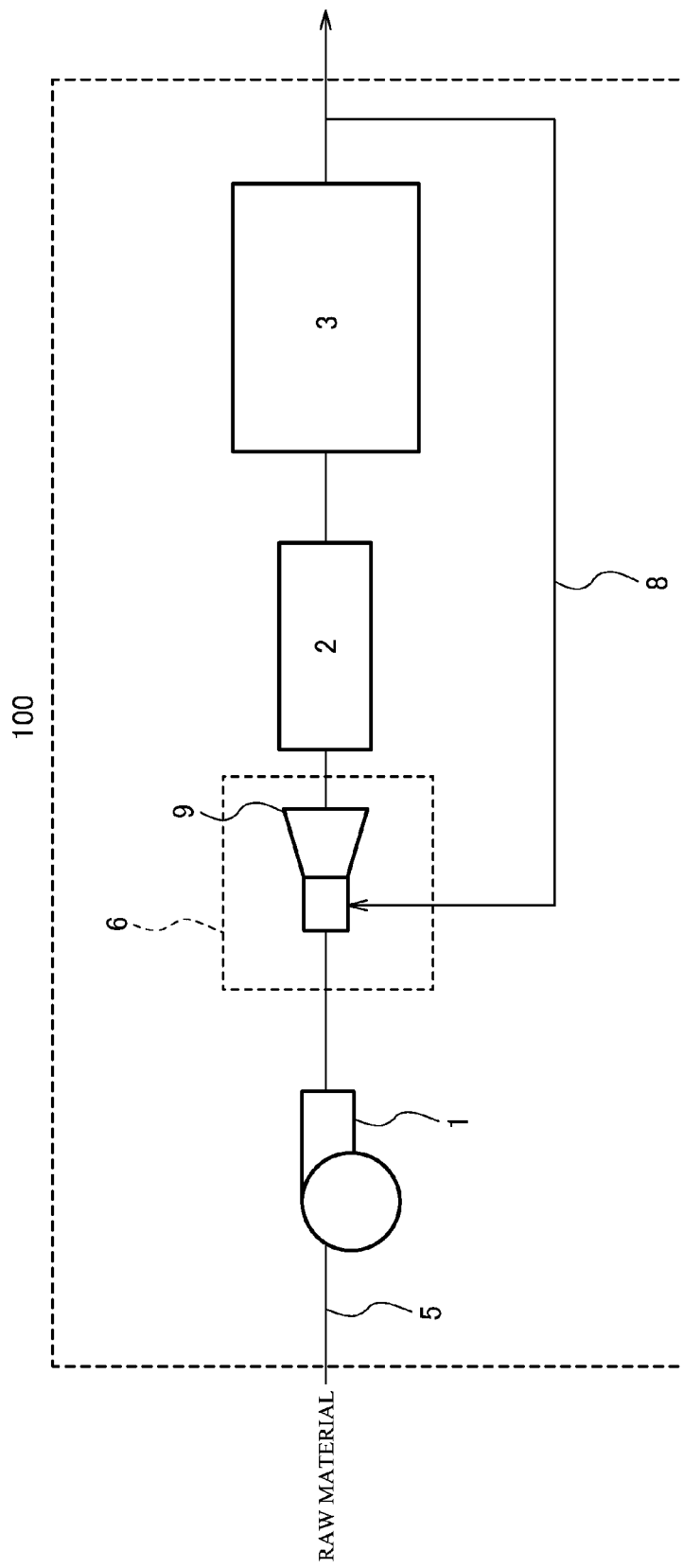
FIG. 9 is a diagram showing one example of the hydrogen generator of Embodiment 7.

FIG. 9 is a diagram showing one example of the hydrogen generator of Embodiment 7.

In the example shown in FIG. 9, the hydrogen generator 100 of the present embodiment includes the reformer 3, the hydro-desulfurizer 2, the raw material supply passage 5, the recycle passage 8, the booster 1, the ejector 9, and a heater 6.

Since the reformer 3, the hydro-desulfurizer 2, the raw material supply passage 5, the recycle passage 8, the booster 1, and the ejector 9 are the same as those in Embodiment 1, explanations thereof are omitted.

The heater 6 heats the ejector 9. The raw material and the hydrogen-containing gas flow through the ejector 9. The hydrogen-containing gas contains steam. Therefore, when the hydrogen-containing gas is cooled, the condensed water may be generated from the steam. For example, in a case where the raw material is lower in temperature than the hydrogen-containing gas, the hydrogen-containing gas is cooled by mixing the hydrogen-containing gas with the raw material. In this case, the passage resistance may increase by the condensed water in the ejector 9, or the passage clogging or the like may occur by the condensed water in the ejector 9. For example, at the thin portion of the raw material supply passage in the ejector 9, the passage resistance is easily increased by the condensed water, or the passage clogging easily occurs by the condensed water. In a case when the passage resistance is increased, a predetermined amount of hydrogen-containing gas cannot be supplied to the hydro-desulfurizer 2. In this case, the hydro-desulfurizer 2 may not adequately remove the sulfur compound in the raw material, and the reforming catalyst of the reformer 3 may be poisoned by the sulfur compound. In a case where the passage clogging has occurred, a predetermined amount of raw material cannot be supplied, so that the hydrogen-containing gas may not be generated by the reformer 3.

Therefore, in the present embodiment, the heater 6 heats the ejector 9 as described above. With this, the steam of the hydrogen-containing gas in the ejector 9 is prevented from being condensed.

The heater 6 may be any heat source as long as it can heat the ejector 9.

For example, the ejector 9 can be heated by heat generated by the reformer 3. In this case, the ejector 9 may be provided on a surface of the reformer 3 or may be provided inside the reformer 3.

In addition, the ejector 9 can be heated by heat generated by a device (such as a fuel cell) that utilizes the hydrogen-containing gas. For example, in the case of the fuel cell, such as a solid-oxide fuel cell, which operates at high temperature, the ejector 9 may be provided inside a hot module of the fuel cell.

In a case where the hydrogen generator 100 includes a combustor configured to heat the reformer 3, the ejector 9 can be heated by heat of a flue gas of the combustor.

The ejector 9 can be heated by a dedicated heat source (such as an electric heater).

Operations

Hereinafter, the operations of the hydrogen generator 100 will be explained in reference to FIG. 9.

While the hydrogen generator 100 is operating, the raw material flows through the hydro-desulfurizer 2, so that the sulfur compound in the raw material is removed.

A part of the hydrogen-containing gas generated by the reformer 3 is returned through the recycle passage 8 to the raw material supply passage, mixed with the raw material, and then supplied to the hydro-desulfurizer 2. By supplying the hydrogen-containing gas to the hydro-desulfurizer 2, the hydro-desulfurizer 2 can remove the sulfur compound in the raw material by the hydrogenation reaction.

At this time, in the present embodiment, the hydrogen-containing gas from the reformer 3 flows through the recycle passage 8, is mixed with the raw material in the ejector 9, and is then supplied to the hydro-desulfurizer 2. To be specific, the mixture gas obtained by mixing the raw material and the recycled gas flows through the raw material supply passage provided downstream of the merging portion where the recycle passage 8 and the raw material supply passage merge with each other. The cross-sectional area of the raw material supply passage in the ejector 9 gradually decreases as described above, and the cross-sectional area of the raw material supply passage provided downstream of the merging portion where the recycle passage 8 and the raw material supply passage merge with each other gradually increases. With this, since the flow velocity of the raw material becomes the highest at the merging portion, the gas pressure becomes the lowest. Then, in a case where the cross-sectional area of the gas passage of the ejector 9 is designed such that the gas pressure of the merging portion becomes lower than the pressure of the upstream side of the recycle passage, the recycled gas can be pulled into the raw material supply passage.

Then, in the present embodiment, when the recycled gas is pulled into the raw material supply passage, the ejector 9 is being heated by the heater 6. The heating temperature of the ejector 9 may be any temperature as long as it is equal to or higher than a dew point of the recycled gas. With this, the steam in the ejector 9 is prevented from being condensed. Thus, the possibility that the passage resistance increases by the condensed water in the ejector 9 or the possibility that the passage clogging occurs by the condensed water in the ejector 9 can be made lower than conventional cases.

The heating of the ejector 9 at the time of the start-up of the hydrogen generator 100 may be started, for example, before the recycled gas starts flowing through the recycle passage 8.

Modification Example 1

The hydrogen generator of Modification Example 1 of Embodiment 7 is configured such that in the hydrogen generator of Embodiment 7, the heater heats the recycle passage.

According to this configuration, the possibility that the passage resistance increases by the condensed water in the ejector or the possibility that the passage clogging occurs by the condensed water in the ejector can be made lower than conventional cases. In addition, the possibility that the passage resistance increases by the condensed water in the recycle passage or the possibility that the passage clogging occurs by the condensed water in the recycle passage can be made lower than conventional cases.

Except for the above features, the hydrogen generator of the present modification example may be the same in configuration as the hydrogen generator of Embodiment 7.

Device Configuration

Figure 10:
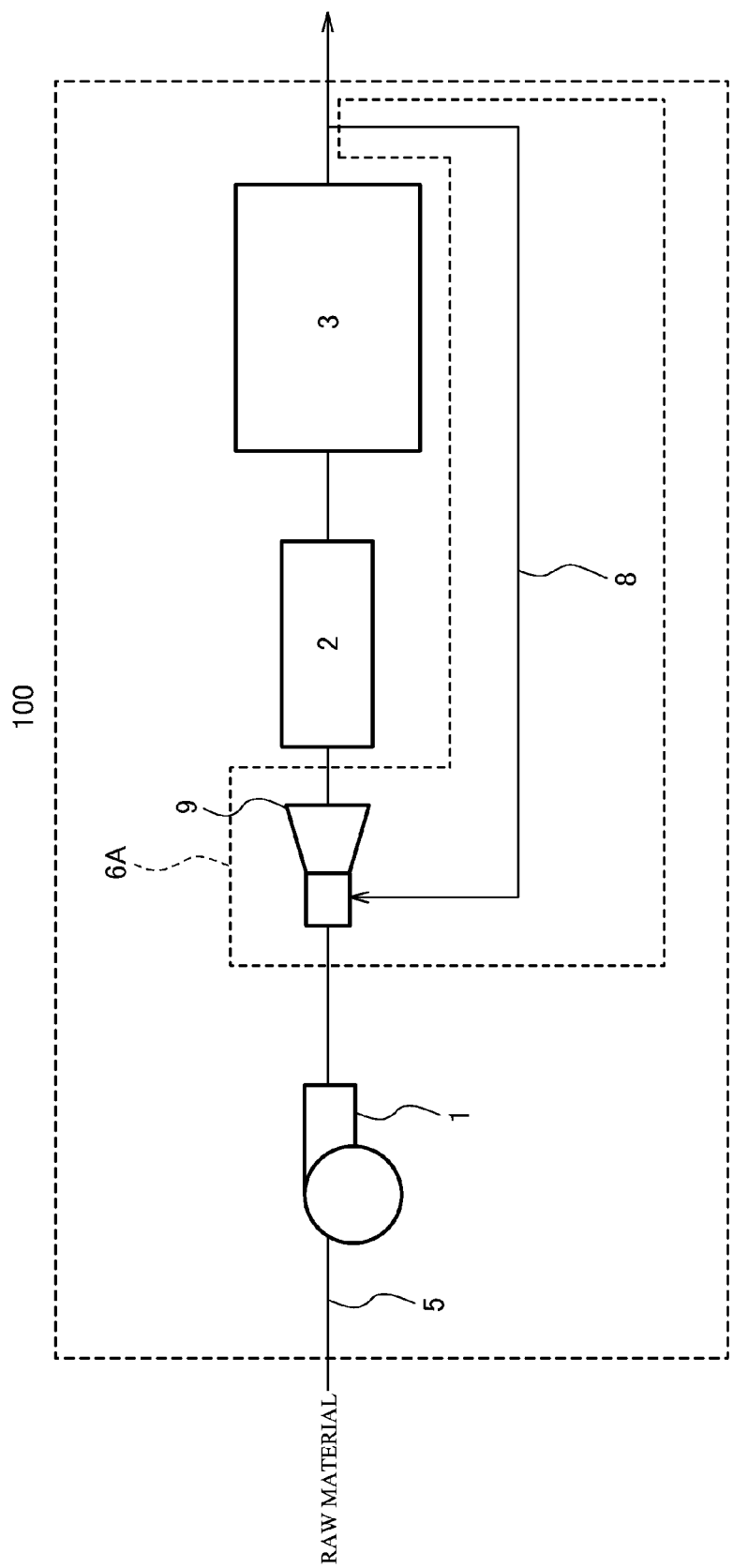
FIG. 10 is a diagram showing one example of the hydrogen generator of Modification Example 1 of Embodiment 7.

FIG. 10 is a diagram showing one example of the hydrogen generator of Modification Example 1 of Embodiment 7.

In the example shown in FIG. 10, the hydrogen generator 100 of the present modification example includes the reformer 3, the hydro-desulfurizer 2, the raw material supply passage 5, the recycle passage 8, the booster 1, the ejector 9, and a heater 6A.

Since the reformer 3, the hydro-desulfurizer 2, the raw material supply passage 5, the recycle passage 8, the booster 1, and the ejector 9 are the same as those in Embodiment 7, explanations thereof are omitted.

The heater 6A heats the recycle passage 8. In the present modification example, as shown in FIG. 10, both the ejector 9 and the recycle passage 8 are heated by the heater 6A.

The heat source of the heater 6A may be the same as the heat source of the heater 6 of Embodiment 7, so that a detailed explanation thereof is omitted.

Since it becomes necessary to heat the recycle passage 8, the amount of heat obtained from the heater 6A of the present modification example may be made larger than the amount of heat obtained from the heater 6 of Embodiment 7, or the amount of heat that is equal to the amount of heat obtained from the heater 6 may be distributedly given from the heater 6A to the ejector 9 and the recycle passage 8. In the present modification example, the amount of heat that is equal to the amount of heat obtained from the heater 6 is distributedly given from the heater 6A to the ejector 9 and the recycle passage 8.

This is because even in the latter case, if it is assumed that the entire amount of heat obtained from the heater 6A is given to the gas flowing in the ejector 9 and the gas flowing in the recycle passage 8, as a whole, the amount of heat that is equal to the amount of heat obtained from the heater 6 of Embodiment 7 is regarded as being used for heating the gas in the ejector 9.

As above, the recycled gas can be pulled into the ejector 9 while maintaining the high temperature of the recycled gas. Thus, the possibility that the passage resistance increases by the condensed water in the ejector 9 and the possibility that the passage clogging occurs by the condensed water in the ejector 9 can be made lower than conventional cases. In addition, the temperature of the recycled gas flowing through the recycle passage 8 can be prevented from decreasing. Thus, the possibility that the passage resistance increases by the condensed water in the recycle passage 8 or the possibility that the passage clogging occurs by the condensed water in the recycle passage 8 can be made lower than conventional cases. By the action of the heating of the recycle passage 8, a condenser may not be disposed on the recycle passage 8. Even in a case where a condenser is disposed on the recycle passage 8, the condenser can be reduced in size.

With this, the configuration of the hydrogen generator 100 can be simplified, and the cost of the hydrogen generator 100 can be reduced.

Modification Example 2

The hydrogen generator of Modification Example 2 of Embodiment 7 is configured such that in the hydrogen generator of Embodiment 7 or Modification Example 1 of Embodiment 7, the heater heats the reformer.

According to this configuration, the possibility that the passage resistance increases by the condensed water in the ejector or the possibility that the passage clogging occurs by the condensed water in the ejector can be made lower than conventional cases. In addition, the possibility that the passage resistance increases by the condensed water in the recycle passage or the possibility that the passage clogging occurs by the condensed water in the recycle passage can be made lower than conventional cases. Further, the amount of heat generated by the heater can be efficiently utilized.

Except for the above features, the hydrogen generator of the present modification example may be the same in configuration as the hydrogen generator of Embodiment 7 or Modification Example 1 of Embodiment 7.

Device Configuration

Figure 11:
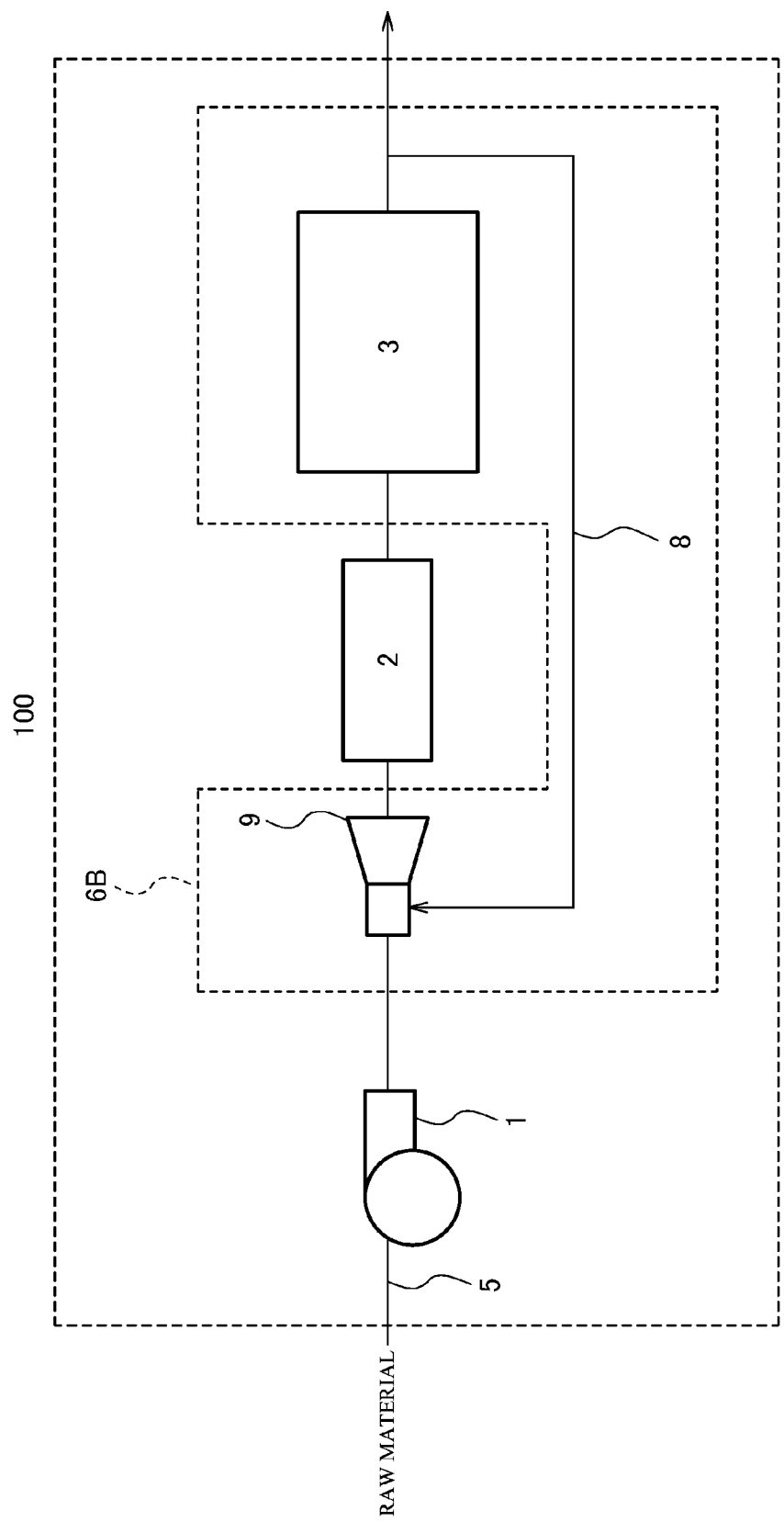
FIG. 11 is a diagram showing one example of the hydrogen generator of Modification Example 2 of Embodiment 7.

FIG. 11 is a diagram showing one example of the hydrogen generator of Modification Example 2 of Embodiment 7.

In the example shown in FIG. 11, the hydrogen generator 100 of the present modification example includes the reformer 3, the hydro-desulfurizer 2, the raw material supply passage 5, the recycle passage 8, the booster 1, the ejector 9, and a heater 6B.

Since the reformer 3, the hydro-desulfurizer 2, the raw material supply passage 5, the recycle passage 8, the booster 1, and the ejector 9 are the same as those in Embodiment 7, explanations thereof are omitted.

The heater 6B heats the reformer 3. In the present modification example, as shown in FIG. 11, the ejector 9, the recycle passage 8, and the reformer 3 are heated by the heater 6B. For example, the heat of the flue gas of the combustor that heats the reformer 3 may be used as the heat source of the heater 6B. In the case of the fuel cell, such as the solid-oxide fuel cell, which operates at high temperature, the heat of the fuel cell may be used as the heat source of the heater 6B.

According to this configuration, the reformer 3, the recycle passage 8, and the ejector 9 can be integrally heated. By the heating of the reformer 3, the heat necessary in the catalytic reaction for generating the hydrogen-containing gas can be obtained. By the heating of the ejector 9, the possibility that the passage resistance increases by the condensed water in the ejector 9 or the possibility that the passage clogging occurs by the condensed water in the ejector 9 can be made lower than conventional cases. By the heating of the recycle passage 8, the possibility that the passage resistance increases by the condensed water in the recycle passage or the possibility that the passage clogging occurs by the condensed water in the recycle passage can be made lower than conventional cases.

By the above configuration, the amount of heat generated by the heater 6B can be efficiently utilized. For example, since the heat of the combustor that heats the reformer 3 can be utilized when heating the recycle passage 8 and the ejector 9, the condensation of the steam in the recycled gas can be efficiently prevented. Depending on the design of the hydrogen generator 100, the heat of the combustor that heats the reformer 3 can cover the entire amount of heat obtained from the heater 6B. Therefore, the configuration of the hydrogen generator 100 can be simplified. With this, the hydrogen generator 100 can be reduced in cost and size.

Embodiment 8

A fuel cell system of Embodiment 2 includes: any one of the hydrogen generators of Embodiments 1 to 7 and Modification Examples 1 and 2 of Embodiment 7; and a fuel cell configured to generate electric power by using the hydrogen-containing gas supplied from the hydrogen generator.

According to this configuration, the possibility that the condensed water is supplied to the booster in the hydrogen generator can be made lower as described above.

Device Configuration

Figure 12:
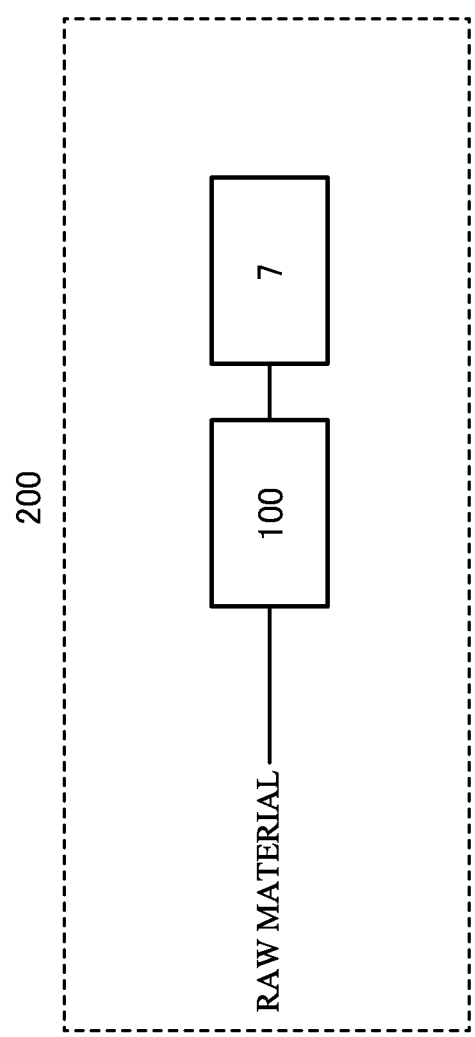
FIG. 12 is a diagram showing one example of the fuel cell system of Embodiment 8.

FIG. 12 is a diagram showing one example of the fuel cell system of Embodiment 8.

In the example shown in FIG. 12, a fuel cell system 200 of the present embodiment includes any one of the hydrogen generators 100 of Embodiments 1 to 7 and Modification Examples 1 and 2 of Embodiment 7 and a fuel cell 7.

The fuel cell 7 generates electric power by using the hydrogen-containing gas supplied from the hydrogen generator 100. The fuel cell 7 may be any type of fuel cell, and examples thereof include a polymer electrolyte fuel cell, a solid-oxide fuel cell, and a phosphoric acid fuel cell.

If the fuel cell 7 is regarded as a hydrogen utilizing device that uses the hydrogen-containing gas generated by any one of the hydrogen generators 100 of Embodiments 1 to 7 and Modification Examples 1 and 2 of Embodiment 7, the operations of the hydrogen generator 100 of the present embodiment are the same as those of the hydrogen generator 100 of any one of Embodiments 1 to 7 and Modification Examples 1 and 2 of Embodiment 7, so that detailed explanations thereof are omitted.

Embodiment 9

The fuel cell system of Embodiment 9 is configured such that in the fuel cell system of Embodiment 8, the fuel cell is a solid-oxide fuel cell, a hot module in which the reformer and the fuel cell are provided is included, and the ejector receives heat from the hot module.

According to this configuration, the heat of the solid-oxide fuel cell is effectively utilized for the heating of the ejector, and the hot module can serve as a heater. Therefore, the configuration of the fuel cell system can be simplified. With this, the fuel cell system can be reduced in cost and size.

Except for the above features, the fuel cell system of the present embodiment may be the same in configuration as the fuel cell system of Embodiment 8.

Device Configuration

Figure 13:
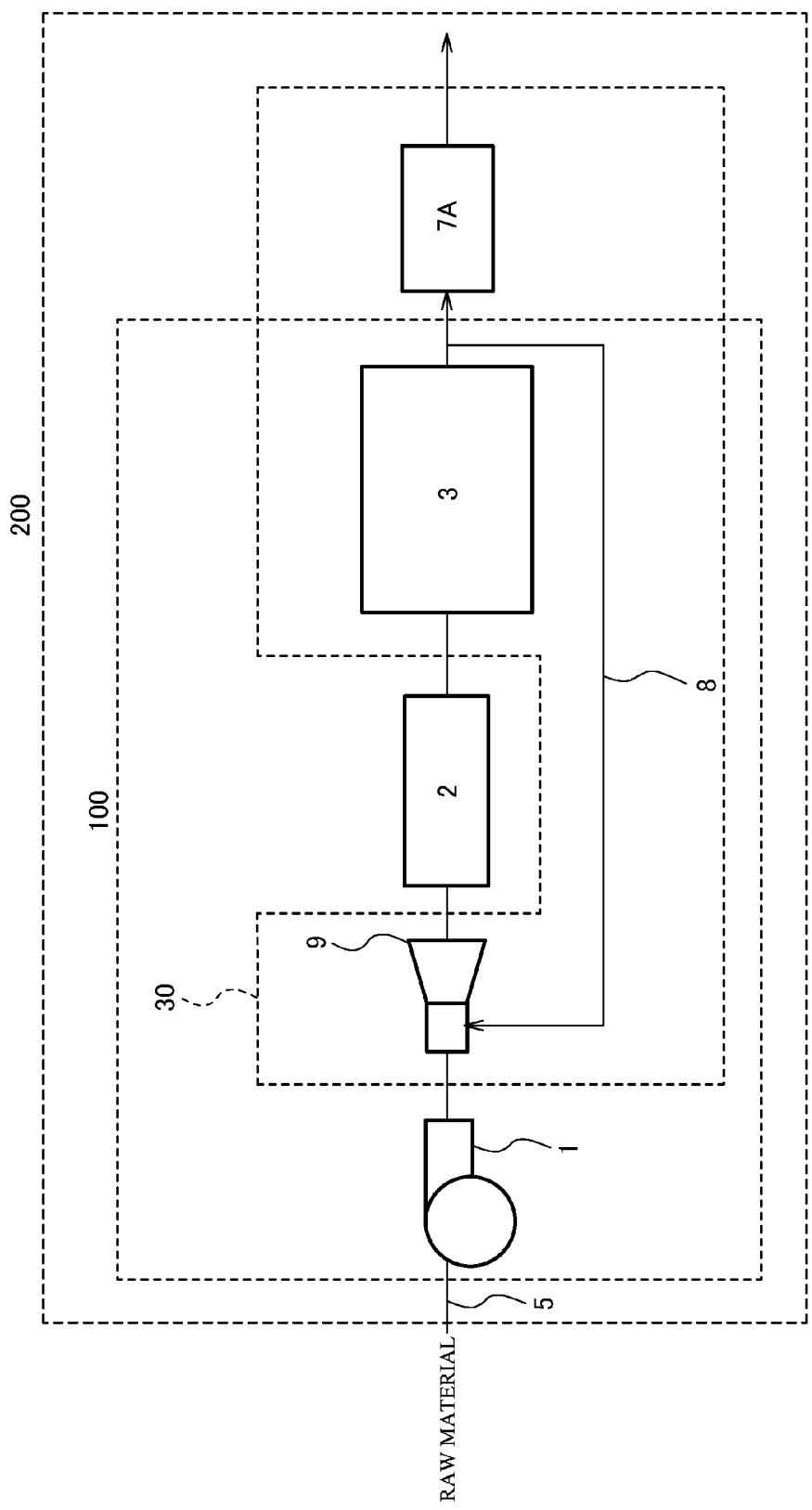
FIG. 13 is a diagram showing one example of the fuel cell system of Embodiment 9.

FIG. 13 is a diagram showing one example of the fuel cell system of Embodiment 9.

In the example shown in FIG. 13, the fuel cell system 200 includes the reformer 3, the hydro-desulfurizer 2, the raw material supply passage 5, the recycle passage 8, the booster 1, the ejector 9, a solid-oxide fuel cell 7A, and a hot module 30.

Since the reformer 3, the hydro-desulfurizer 2, the raw material supply passage 5, the recycle passage 8, and the booster 1 are the same as those in Embodiment 8, explanations thereof are omitted.

The solid-oxide fuel cell 7A generates electric power by using the hydrogen-containing gas supplied from the hydrogen generator 100. Specifically, the solid-oxide fuel cell 7A uses ion-conductive ceramics as an electrolyte. Oxide ions purified by an air electrode pass through the electrolyte and react with the hydrogen in a fuel electrode. Thus, the solid-oxide fuel cell 7A generates electricity and heat. The operating temperature of the solid-oxide fuel cell 7A is high, that is, about 700° C. to 1,000° C. Therefore, to prevent the heat release from high-temperature portions of the fuel cell system 200 and efficiently utilize the heat of the high-temperature portions, typically, only the high-temperature portions of the fuel cell system 200 are integrated as a module to form a heat insulating configuration.

Therefore, as shown in FIG. 13, the hot module 30 includes therein the reformer 3 and the solid-oxide fuel cell 7A. In the present embodiment, the solid-oxide fuel cell 7A and the reformer 3 are examples of the high-temperature portions of the fuel cell system 200 and are integrated as a module. By integrating the high-temperature portions as a module, the heat release by the movement of the gas between devices that operate at high temperature is prevented, so that the heat efficiency of the fuel cell system 200 improves. In addition, by integrating the high-temperature portions as a module, the heat insulation of high heat efficiency can be realized.

The ejector 9 receives the heat from the hot module 30. Specifically, instead of the heaters 6, 6A, and 6B, the high-temperature hot module 30 heats the ejector 9. With this, the possibility that the passage resistance increases by the condensed water in the ejector 9 or the possibility that the passage clogging occurs by the condensed water in the ejector 9 can be made lower than conventional cases. Instead of the heaters 6A and 6B, the high-temperature hot module 30 may heat the recycle passage 8. With this, the possibility that the passage resistance increases by the condensed water in the recycle passage 8 or the possibility that the passage clogging occurs by the condensed water in the recycle passage 8 can be made lower than conventional cases.

In the present embodiment, as shown in FIG. 13, the recycle passage 8 and the ejector 9 are provided inside the hot module 30. With this, the recycle passage 8 and the ejector 9 easily receive heat from the hot module 30.

The durability of the booster 1 deteriorates under a high temperature environment, so that heat-resistant, expensive parts need to be used. Therefore, in the present embodiment, the booster 1 is provided outside the hot module 30, so that the booster 1 is less likely to receive the heat from the hot module 30.

FIG. 13 shows an example in which the hydro-desulfurizer 2 is provided outside the hot module 30. However, the hydro-desulfurizer 2 may be provided inside the hot module 30. With this, the hydro-desulfurizer 2 can be heated by the hot module 30.

The operations of the fuel cell system 200 of the present embodiment may be the same as those in Embodiment 8, so that detailed explanations thereof are omitted.

Embodiment 10

The fuel cell system of Embodiment 10 is configured such that the fuel cell system of Embodiment 9 includes an on-off valve disposed on the raw material supply passage extending between the booster and the ejector, and the on-off valve is provided outside the hot module.

According to this configuration, the flow of the gas between the booster and the ejector can be appropriately blocked by using the on-off valve.

Except for the above features, the fuel cell system of the present embodiment may be the same in configuration as the fuel cell system of Embodiment 9.

Device Configuration

Figure 14:
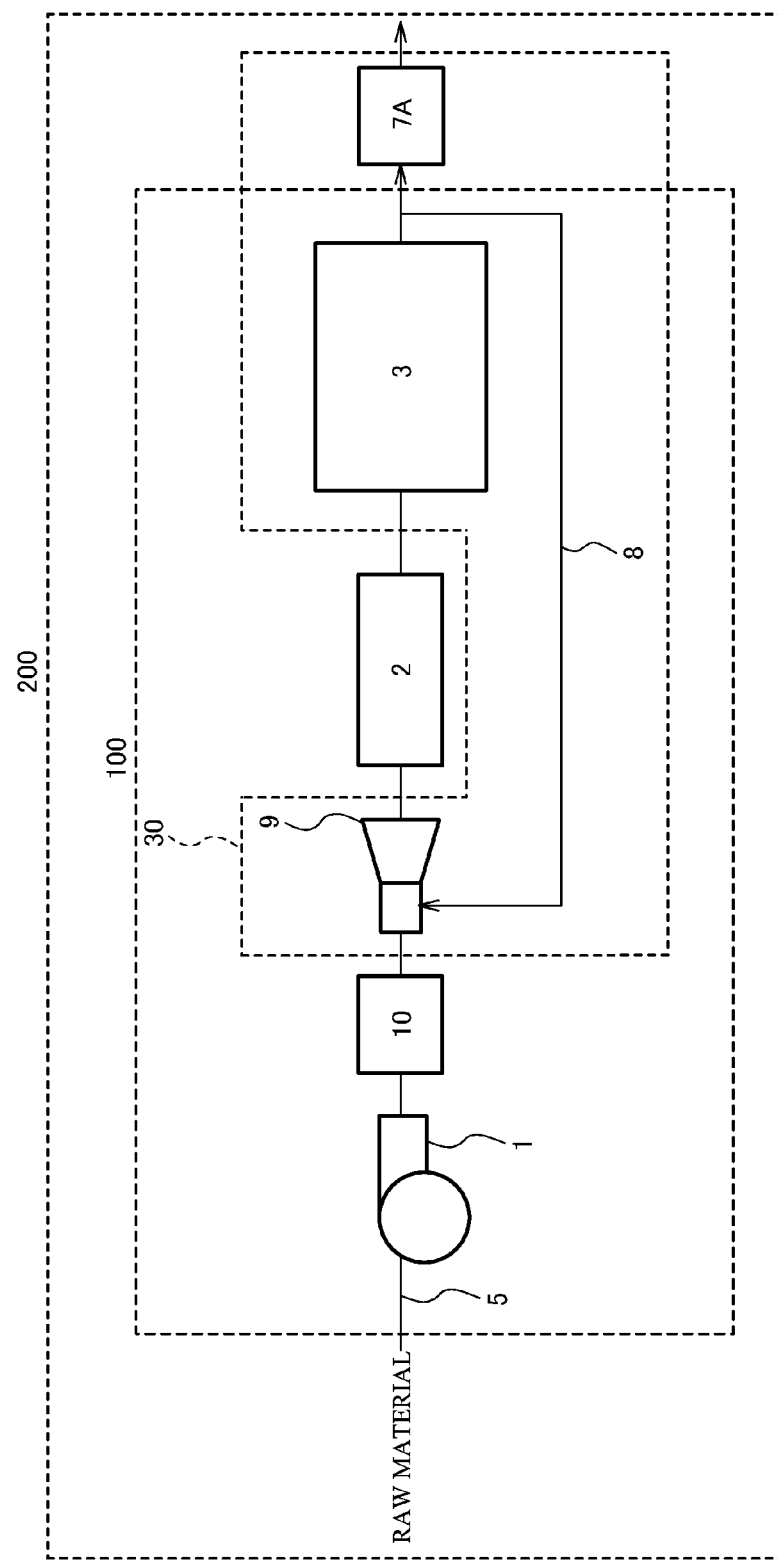
FIG. 14 is a diagram showing one example of the fuel cell system of Embodiment 10.

FIG. 14 is a diagram showing one example of the fuel cell system of Embodiment 10.

In the example shown in FIG. 14, the fuel cell system 200 includes the reformer 3, the hydro-desulfurizer 2, the raw material supply passage 5, the recycle passage 8, the booster 1, the ejector 9, the solid-oxide fuel cell 7A, the hot module 30, and an on-off valve 10.

Since the reformer 3, the hydro-desulfurizer 2, the raw material supply passage 5, the recycle passage 8, the booster 1, the ejector 9, the solid-oxide fuel cell 7A, and the hot module 30 are the same as those in Embodiment 9, explanations thereof are omitted.

The on-off valve 10 is disposed on the raw material supply passage extending between the booster 1 and the ejector 9. With this, the flow of the gas between the booster 1 and the ejector 9 is blocked. The on-off valve 10 may have any configuration as long as it can block the flow of the gas between the booster 1 and the ejector 9. For example, the on-off valve 10 may be a solenoid valve.

The on-off valve 10 is provided outside the hot module 30. To realize stable operations of the on-off valve 10 under a high temperature environment, a large-scale on-off valve needs to be constituted by expensive members as the on-off valve 10. However, the use of such on-off valve 10 may cause the increases in cost and size of the fuel cell system 200. Therefore, in the present embodiment, the on-off valve 10 is provided outside the hot module 30, so that the on-off valve 10 is less likely to receive the heat from the hot module 30.

FIG. 14 shows an example in which the hydro-desulfurizer 2 is provided outside the hot module 30. However, the hydro-desulfurizer 2 may be provided inside the hot module 30. With this, the hydro-desulfurizer 2 can be heated by the hot module 30.

Operations

Hereinafter, the operations of the fuel cell system 200 will be explained in reference to FIG. 14.

When the fuel cell system 200 is operating, the on-off valve 10 is open. With this, the raw material can be supplied to the ejector 9 by the booster 1.

When the fuel cell system 200 stops operating, the on-off valve 10 is closed. With this, the flow of the gas between the booster 1 and the ejector 9 is blocked by the on-off valve 10, so that the supply of the raw material from the booster 1 to the ejector 9 is stopped. There is a possibility that in a case where the on-off valve 10 remains open, a residual gas flows from the booster 1 into the ejector 9 for a while even after the stop of the operation of the booster 1. This possibility can be reduced by closing the on-off valve 10.

Since the flow of the gas between the booster 1 and the ejector 9 is blocked by the on-off valve 10, the backward flow of the gas in the hot module 30 to the booster 1 can be prevented. For example, depending on the behaviors of the reformer 3 and the solid-oxide fuel cell 7A, the gas in the hot module 30 may flow backward to the booster 1 by the increase in internal pressure of the reformer 3 or the solid-oxide fuel cell 7A. Examples of the gas in the hot module 30 include: the raw material; the recycled gas; the hydrogen-containing gas before the hydrogen-containing gas flows into the solid-oxide fuel cell 7A; and the hydrogen-containing gas (off gas) that has flowed out from the solid-oxide fuel cell 7A. If the gas flows backward to the booster 1, there are possibilities that the booster 1 malfunctions and that the passage resistance increases by the condensed water in the booster 1 or the passage clogging or the like occurs by the condensed water in the booster 1. Such possibilities can be reduced by closing the on-off valve 10.

Open and close timings of the on-off valve 10 may be associated with operation timings of the gas supply by the booster 1. For example, the on-off valve 10 may open substantially simultaneously with or before an operation start timing of the booster 1, and the on-off valve 10 may close substantially simultaneously with or after an operation stop timing of the booster 1.

Except for the above operations, the operations of the fuel cell system 200 of the present embodiment may be the same as those in Embodiment 9.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

According to one aspect of the present invention, the possibility that the condensed water is supplied to the booster can be made lower than conventional cases. Therefore, one aspect of the present invention can be utilized in, hydrogen generators, fuel cell systems, and the like.

REFERENCE SIGNS LIST 1 booster
2 hydro-desulfurizer
3 reformer
5 raw material supply passage
8 recycle passage
9 ejector
11 first branch passage
12 ordinary temperature desulfurizer
13 switching unit
14 second branch passage
15 controller
20 third branch passage

The invention claimed is:

1. A hydrogen generator comprising:
    a reformer configured to generate a hydrogen-containing gas by using a raw material;
    a hydro-desulfurizer configured to remove a sulfur compound in the raw material;
    a recycle passage through which the hydrogen-containing gas is supplied to the raw material before the raw material flows into the hydro-desulfurizer;
    a booster configured to supply the raw material to the reformer;
    a raw material supply passage through which the raw material to be supplied to the reformer flows; and
    an ejector which is disposed on the raw material supply passage provided downstream of the booster and upstream of the hydro-desulfurizer and into which the hydrogen-containing gas flows from the recycle passage.

2. The hydrogen generator according to claim 1, further comprising:
    a first branch passage that branches from the raw material supply passage extending between the booster and the ejector and merges with the raw material supply passage extending between the ejector and the hydro-desulfurizer;
    an ordinary temperature desulfurizer disposed on the first branch passage and configured to remove the sulfur compound in the raw material; and
    a switching unit configured to switch such that the raw material flows to the ejector or the ordinary temperature desulfurizer.

3. The hydrogen generator according to claim 2, further comprising a controller configured to control the switching unit, wherein:
    in a case where a flow rate of the raw material is a predetermined threshold or higher, the controller switches such that the raw material flows through the ejector; and
    in a case where the flow rate of the raw material is lower than the predetermined threshold, the controller switches such that the raw material flows through the ordinary temperature desulfurizer.

4. The hydrogen generator according to claim 1, further comprising:
    a second branch passage that branches from the raw material supply passage extending between the booster and the ejector and merges with the raw material supply passage extending between the hydro-desulfurizer and the reformer;
    an ordinary temperature desulfurizer disposed on the second branch passage and configured to remove the sulfur compound in the raw material; and
    a switching unit configured to switch such that the raw material flows through the ejector or the ordinary temperature desulfurizer.

5. The hydrogen generator according to claim 1, further comprising:
    a third branch passage that branches from the raw material supply passage provided upstream of the booster and merges with the raw material supply passage provided upstream of the booster;

an ordinary temperature desulfurizer disposed on the third branch passage and configured to remove the sulfur compound in the raw material; and a switching unit configured to switch such that the raw material flows through the ordinary temperature desulfurizer or the raw material supply passage.

6. The hydrogen generator according to claim 1, further comprising:

a first branch passage that branches from the raw material supply passage extending between the booster and the ejector and merges with the raw material supply passage extending between the ejector and the hydro-desulfurizer; and a switching unit configured to switch such that the raw material flows through the ejector or the first branch passage.

7. The hydrogen generator according to claim 1, further comprising a heater configured to heat the ejector.

8. The hydrogen generator according to claim 7, wherein the heater heats the recycle passage.

9. The hydrogen generator according to claim 7, wherein the heater heats the reformer.

10. A fuel cell system comprising:

the hydrogen generator according to claim 1;

a fuel cell configured to generate electric power by using the hydrogen-containing gas supplied from the hydrogen generator.

11. The fuel cell system according to claim 10, wherein:

the fuel cell is a solid-oxide fuel cell;

a hot module in which the reformer and the fuel cell are provided is included; and the ejector receives heat from the hot module.

12. The fuel cell system according to claim 11, further comprising an on-off valve disposed on the raw material supply passage extending between the booster and the ejector, wherein the on-off valve is provided outside the hot module.

* * * * *